US 7,540,908 B2

(12) United States Patent
Sao et al.

(10) Patent No.: US 7,540,908 B2
(45) Date of Patent: *Jun. 2, 2009

(54) INK COMPOSITION, INK CARTRIDGE, RECORDING METHOD, AND RECORDED PRODUCT

(75) Inventors: Akihito Sao, Matsumoto (JP); Hidefumi Maruyama, Azumino (JP); Kazuhiko Kitamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 11/800,660

(22) Filed: May 7, 2007

(65) Prior Publication Data

US 2007/0265376 A1      Nov. 15, 2007

(30) Foreign Application Priority Data

May 12, 2006  (JP)  ............................. 2006-133576
Nov. 15, 2006 (JP)  ............................. 2006-309422

(51) Int. Cl.
*C09D 11/02* (2006.01)
*B41J 2/01* (2006.01)

(52) U.S. Cl. .............. 106/31.43; 106/31.48; 106/31.58; 106/31.59; 106/31.75; 106/31.86; 106/31.89; 347/100

(58) Field of Classification Search ............... 106/31.43, 106/31.48, 31.58, 31.59, 31.75, 31.86, 31.89; 347/100

See application file for complete search history.

(56) References Cited

U.S. PATENT DOCUMENTS

| 6,821,329 B2 * | 11/2004 | Choy ........................ 106/31.58 |
| 7,048,789 B2 * | 5/2006 | Taguchi et al. ........... 106/31.43 |
| 7,077,894 B2 * | 7/2006 | Taguchi et al. ........... 106/31.43 |
| 7,404,851 B2 * | 7/2008 | Arai ......................... 106/31.48 |
| 7,416,592 B2 * | 8/2008 | Kitamura et al. ......... 106/31.48 |
| 2007/0261597 A1 * | 11/2007 | Sao et al. ....................... 106/38 |
| 2007/0263058 A1 * | 11/2007 | Sao et al. .................. 106/31.43 |
| 2007/0265376 A1 * | 11/2007 | Sao et al. ...................... 524/160 |
| 2008/0145562 A1 * | 6/2008 | Kitamura et al. ......... 106/31.48 |
| 2008/0220168 A1 * | 9/2008 | Sao et al. .................. 106/31.13 |

FOREIGN PATENT DOCUMENTS

| JP | 2004-315739 | 11/2004 |
| JP | 2005-187790 | 7/2005 |

OTHER PUBLICATIONS

Patent Abstracts of Japan of JP 2004-315739 Dated Nov. 11, 2004.
Patent Abstracts of Japan of JP 2005-187790 Dated Jul. 14, 2005.

* cited by examiner

*Primary Examiner*—Helene Klemanski
(74) *Attorney, Agent, or Firm*—Ladas and Parry LLP

(57) ABSTRACT

An ink composition comprising: a betaine-based surfactant represented by the following general formula (1) and a linear saturated aliphatic alcohol having a hydroxyl value of 1 to 2 and 4 to 6 carbon atoms:

[C 1]

$$(R)_p\text{—N—}[L\text{-}(COOM)_q]_r \quad \text{Formula (1)}$$

(wherein, R represents a hydrogen atom, alkyl group, aryl group or heterocyclic group, L represents a divalent or more linking group, M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion formed of an N atom in formula (1), q represents an integer of 1 or more, r represents an integer of 1 to 4, p represents an integer of 0 to 4, p+r is 3 or 4, N is a nitrogen atom that composes a quaternary amine in the case p+r is 4, R may be the same or different when p is 2 or more, COOM may be the same or different when q is 2 or more, and $L\text{-}(COOM)_q$ may be the same or different when r is 2 or more).

26 Claims, No Drawings

INK COMPOSITION, INK CARTRIDGE, RECORDING METHOD, AND RECORDED PRODUCT

CROSS-REFERENCES TO RELATED APPLICATIONS

The entire disclosure of Japanese Patent Application No. 2006-133576, filed on May 12, 2006 and Japanese Patent Application No. 2006-309422, filed on Nov. 15, 2006, is expressly incorporated by reference herein.

BACKGROUND

1. Technical Field

The present invention relates to an ink composition and a recording method and recorded article using the same, and more particularly, to an ink composition having little foaming and satisfactory defoaming properties, and therefore having superior reliability (such as clogging recoverability and discharge stability), while enabling attractive color development as well as having superior image durability (such as light resistance and moisture resistance) and being able to maintain printer performance for a long period of time, an ink jet recording method that uses an ink composition having these properties, and a recorded article obtained with that recording method that maintains a state of attractive color development for a long period of time.

2. Related Art

The ink jet recording method is a printing method whereby printing is carried out by projecting droplets of ink and causing them to adhere to a recording medium such as paper. Improvement of printing quality and storage of printed articles has been proposed by using for the ink a colorant in the form of a pigment or dye as a composition used together with a surfactant and resin fine particles.

However, since the use of such a surfactant causes the ink to have high foaming and low defoaming properties due to the properties thereof, ink compositions containing a surfactant had the problem of lacking reliability in terms of discharge stability, clogging recoverability and the like (see Japanese Patent Application Laid-open No. 2004-315739). Therefore, there has been a need for a technology that inhibits foaming and improves defoaming properties for ink compositions containing a surfactant.

On the other hand, studies have also been conducted on the use of a diverse range of surfactants (such as betaine-based surfactants) and resin fine particles in response to a growing demand for higher printing quality and greater stability of printed articles being placed on ink jet printers in recent years (see Japanese Patent Application Laid-open No. 2005-187790).

SUMMARY

With the foregoing in view, an object of the present invention is to provide an ink composition having little foaming and satisfactory defoaming properties, while also having superior printing stability and enabling attractive color development, an ink jet recording method that uses an ink composition having such properties, and a recorded article having high image quality obtained with that recording method.

In addition, with the foregoing in view, an object of the present invention is to provide an ink composition having little foaming and satisfactory defoaming properties, superior printing stability, and enabling high image durability and attractive color development, an ink jet recording method that uses an ink composition having such properties, and a recorded article having high image quality obtained with that recording method.

As a result of conducting extensive studies to solve the above-mentioned problems, the inventors of the present invention obtained the finding that (i) an ink composition at least containing a specific betaine-based surfactant and a specific alcohol demonstrates the effects of dramatically improving foaming and defoaming properties.

Next, as a result of conducting further studies on the basis of this finding, the inventors of the present invention found that (ii) adequate discharge stability can be secured by using a specific compound for the defoaming agent and optimizing the ratio of each incorporated in the ink composition.

In addition, the finding was obtained that an ink composition containing a specific magenta dye and a specific betaine-based surfactant has high image durability, and that effects that dramatically improve foaming and defoaming properties are demonstrated by containing a specific alcohol.

The present invention provides the following inventions based on this finding:

[1] an ink composition comprising: a betaine-based surfactant represented by the following general formula (1) and a linear saturated aliphatic alcohol having a hydroxyl value of 1 to 2 and 4 to 6 carbon atoms:

[C 1]

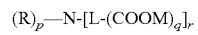　　　　　　　　　　　　　　　Formula (1)

(wherein, R represents a hydrogen atom, alkyl group, aryl group or heterocyclic group, L represents a divalent or more linking group, M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion formed of an N atom in formula (1), q represents an integer of 1 or more, r represents an integer of 1 to 4, p represents an integer of 0 to 4, p+r is 3 or 4, N is a nitrogen atom that composes a quaternary amine in the case p+r is 4, R may be the same or different when p is 2 or more, COOM may be the same or different when q is 2 or more, and L-(COOM)$_q$ may be the same or different when r is 2 or more);

[2] the ink composition described in [1] above, wherein the betaine-based surfactant represented by formula (1) is a compound represented by the following formula (1-1):

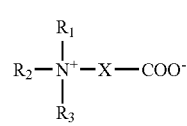　　　　　　　　　　　　　　　Formula (1-1)

[C 2]

(wherein, R$_1$ to R$_3$ represent an alkyl group having 1 to 20 carbon atoms, and X represents a divalent linking group);

[3] the ink composition described in [1] above, wherein the betaine-based surfactant represented by formula (1) is a compound represented by the following formula (1-2):

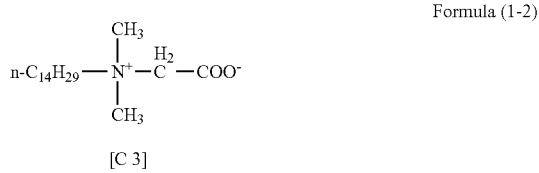

Formula (1-2)

[C 3]

[4] the ink composition described in [1] above, wherein the content of the linear saturated aliphatic alcohol having a hydroxyl value of 1 to 2 and 4 to 6 carbon atoms is 0.25 to 5.00% by weight;

[5] the ink composition described in [1] above, wherein the ratio of the content of the linear saturated aliphatic alcohol having a hydroxyl value of 1 to 2 and 4 to 6 carbon atoms to the content of the betaine-based surfactant is a weight ratio of 1:3 to 1:0.4;

[6] the ink composition described in [1] above, wherein the linear saturated aliphatic alcohol is one or more types selected from the group consisting of 1-butyl alcohol, 2-butyl alcohol, 1-pentyl alcohol, 2-pentyl alcohol, 3-pentyl alcohol, 1-hexyl alcohol and 1,2-hexanediol;

[7] the ink composition described in [1] above, wherein the linear saturated aliphatic alcohol has 5 or 6 carbon atoms;

[8] the ink composition described in [7] above, wherein the linear saturated aliphatic alcohol is at least one type selected from the group consisting of 1-pentyl alcohol, 2-pentyl alcohol, 3-pentyl alcohol, 1-hexyl alcohol and 1,2-hexanediol;

[9] an ink composition comprising a magenta dye represented by the following general formula (2), a betaine-based surfactant represented by the following general formula (1), and a linear saturated aliphatic alcohol having a hydroxyl value of 1 to 2 and 4 to 6 carbon atoms:

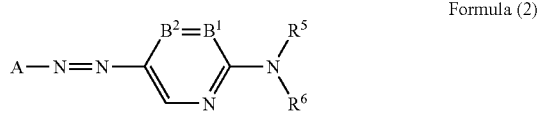

Formula (2)

[C 4]

(wherein, A represents a residue of a five-member heterocyclic diazo component A-NH$_2$, B$^1$ and B$^2$ respectively represent —CR$^1$= or —CR$^2$= or one represents a nitrogen atom and the other represents —CR$^1$= or —CR$^3$=, R$^5$ and R$^6$ respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, each group may further have a substituent, G, R$^1$ and R$^2$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryloxycarbonylamino group, alkyl and arylsulfonylamino group, aryloxycarbonylamino group, nitro group, alkyl and arylthio group, alkyl and arylsulfonyl group, alkyl and arylsulfinyl group, sulfamoyl group, sulfo group or heterocyclic thio group, each group may be further substituted, and R$^1$ and R$^5$ or R$^1$ and R$^3$ may be bonded to form a five- to six-member ring),

[C 1]

$(R)_p$—N—[L-(COOM)$_q$]$_r$

Formula (1)

(wherein, R represents a hydrogen atom, alkyl group, aryl group or heterocyclic group, L represents a divalent or more linking group, M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion formed of an N atom in formula (1), q represents an integer of 1 or more, r represents an integer of 1 to 4, p represents an integer of 0 to 4, p+r is 3 or 4, N is a nitrogen atom that composes a quaternary amine in the case p+r is 4, R may be the same or different when p is 2 or more, COOM may be the same or different when q is 2 or more, and L-(COOM)$_q$ may be the same or different when r is 2 or more);

[10] the ink composition described in [9] above, wherein the linear saturated aliphatic alcohol is one or more types selected from the group consisting of 1-butyl alcohol, 2-butyl alcohol, 2-pentyl alcohol, 3-pentyl alcohol, 1-hexyl alcohol and 1,2-hexanediol;

[11] the ink composition described in [9] above, wherein the linear saturated aliphatic alcohol has 5 or 6 carbon atoms;

[12] the ink composition described in [9] above, wherein the linear saturated aliphatic alcohol is one or more types selected from the group consisting of 2-pentyl alcohol, 3-pentyl alcohol and 1-hexyl alcohol;

[13] the ink composition described in [9] above, wherein the content of the linear saturated aliphatic alcohol having a hydroxyl value of 1 to 2 and 4 to 6 carbon atoms is 0.25 to 3.00% by weight;

[14] the ink composition described in [9] above, wherein the magenta dye represented by the formula (2) is a magenta dye represented by the following general formula (3):

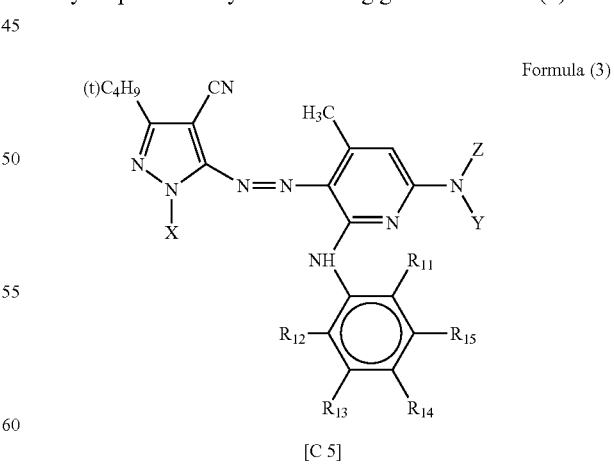

Formula (3)

[C 5]

(wherein, R$_{11}$ and R$_{12}$ respectively and independently an alkyl group, alkoxy group or halogen atom, the total number of carbon atoms that compose the alkyl groups is 3 or more when R$_{11}$ and R$_{12}$ are both alkyl groups, these groups may be further substituted, $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted, $R_{11}$ and $R_{15}$ or $R_{12}$ and $R_{13}$ may be mutually condensed into a ring, X represents a hydrogen atom, aliphatic group, aromatic group or heterocyclic group, Y and Z respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, and each group may further have a substituent);

[15] the ink composition described in [9] above, wherein the magenta dye represented by the formula (2) is a magenta dye represented by the following general formula (4):

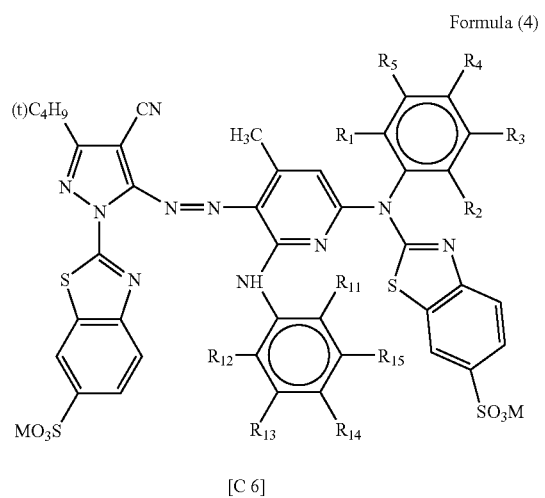

Formula (4)

[C 6]

(wherein, $R_1$ and $R_2$ respectively and independently represent an alkyl group, alkoxy group or halogen atom, the total number of carbon atoms that compose the alkyl groups is 3 or more when both $R_1$ and $R_2$ are alkyl groups, these groups may be further substituted, $R_3$, $R_4$ and $R_5$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted, $R_1$ and $R_5$ or $R_2$ and $R_3$ may be mutually condensed into a ring, $R_{11}$ and $R_{12}$ respectively and independently represent an alkyl group, alkoxy group or halogen atom, the total number of carbon atoms that compose the alkyl groups is 3 or more when $R_{11}$ and $R_{12}$ are both alkyl groups, these may be further substituted, $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted, $R_{11}$ and $R_{15}$ or $R_{12}$ and $R_{13}$ may be mutually condensed into a ring, and M represents hydrogen, lithium, sodium, potassium, ammonium or an organic amine);

[16] the ink composition described in [9] above, wherein the magenta dye represented by the formula (2) is a magenta dye represented by the following formula (5):

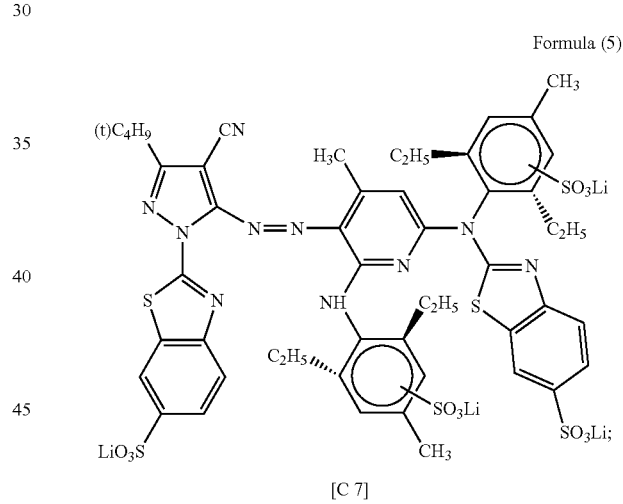

Formula (5)

[C 7]

[17] the ink composition described in [9] above, wherein the content of the magenta dye is 0.50 to 5.00% by weight based on the total weight of the ink composition;

[18] the ink composition described in [9] above, wherein the betaine-based surfactant represented by the formula (1) is a compound represented by the following general formula (1-1):

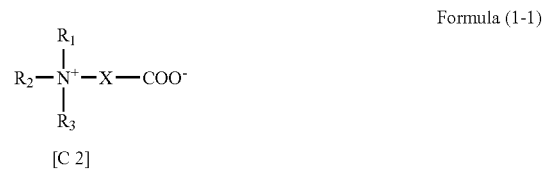

Formula (1-1)

[C 2]

(wherein, $R_1$ to $R_3$ represent an alkyl group having 1 to 20 carbon atoms, and X represents a divalent linking group);

[19] the ink composition described in [9] above, wherein the betaine-based surfactant represented by the general formula (1) is a compound represented by the following formula (1-2):

Formula (1-2)

[C 3]

[20] the ink composition described in [9] above, wherein the ratio of the content of the linear saturated aliphatic alcohol having a hydroxyl value of 1 to 2 and 4 to 6 carbon atoms to the content of the betaine-based surfactant is a weight ratio of 1:5 to 1:0.25;

[21] the ink composition described in [9] above, wherein the ratio of the content of the betaine-based surfactant to the content of the magenta dye is a weight ratio of 1:1.2 to 1:0.2;

[22] the ink composition described in any one of [1] to [21] above, wherein the ink composition is used in an ink jet recording method in which liquid droplets of the ink composition are discharged and the liquid droplets are adhered to a recording medium for performing recording;

[23] the ink composition described in [22] above, wherein the ink jet recording method is a recording method that uses an ink jet head that forms ink droplets by mechanical deformation of a piezoelectric device;

[24] an ink cartridge filled with the ink composition as described in any of [1] to [21] above;

[25] an ink jet recording method comprising the use of the ink composition as described in any of [1] to [21] above for the ink composition, and the use of the ink jet cartridge as described in [24] above; and,

[26] a recorded article recorded according to the ink jet recording method described in [25] above.

Since the ink composition of the present invention exhibits little foaming and has superior defoaming properties and satisfactory printing stability, it can be preferably used as an ink for existing ink jet printers.

In addition, since the ink composition of the present invention has superior image durability (such as light resistance and moisture resistance), exhibits little foaming, has superior defoaming properties and has satisfactory printing stability, it can be preferably used as an ink for ink jet printers.

Consequently, the ink composition of the present invention is able to provide recorded articles of high image quality in a typical ink jet recording method.

DESCRIPTION OF EXEMPLARY EMBODIMENTS

The following provides an explanation of preferable embodiments of the present invention.

In the ink composition of the present invention, it is important to contain a betaine-based surfactant represented by the following general formula (1) and a linear saturated aliphatic alcohol having a hydroxyl value of 1 to 2 and 4 to 6 carbon atoms.

In the present invention, a linear saturated aliphatic alcohol refers to an alcohol having a linear saturated aliphatic backbone and a hydroxyl group, and the hydroxyl group may be bonded to any of the carbon atoms that compose the saturated hydrocarbon backbone.

[C 1]

Formula (1)

(In formula (1) above, R represents a hydrogen atom, alkyl group, aryl group or heterocyclic group. L represents a divalent or more linking group. M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion comprised of an N atom in formula (1). q represents an integer of 1 or more, and r represents an integer of 1 to 4. p represents an integer of 0 to 4, and p+r is 3 or 4. N is a nitrogen atom that composes a quaternary amine in the case p+r is 4. R may be the same or different when p is 2 or more. COOM may be the same or different when q is 2 or more. L-(COOM)$_q$ may be the same or different when r is 2 or more.)

[Betaine-Based Surfactant]

The betaine-based surfactant used in the ink composition of the present embodiment is a betaine-based surfactant represented by the following formula (1).

[C 1]

Formula (1)

In the formula, R represents a hydrogen atom, alkyl group, aryl group or heterocyclic group. L represents a divalent or more linking group. M represents a hydrogen atom, alkaline metal atom, ammonium group, protonated organic amine or nitrogen-containing heterocyclic group or quaternary ammonium ion group, or represents a group that does not exist as a cation in the case of being a counter ion of an ammonium ion comprised of an N atom in formula (1). q represents an integer of 1 or more, and r represents an integer of 1 to 4. p represents an integer of 0 to 4, and p+r is 3 or 4. N is a nitrogen atom that composes a quaternary amine in the case p+r is 4. R may be the same or different when p is 2 or more. COOM may be the same or different when q is 2 or more. L-(COOM)$_q$ may be the same or different when r is 2 or more.

The betaine-based surfactant used in the ink composition of the present embodiment is preferably a betaine-based surfactant represented by the following formula (1-1) in terms of improving fixation of the ink composition to a printed article, light resistance and ozone resistance. One type of compound represented by the following formula (1-1) may be used alone or a plurality of types may be used as a mixture thereof.

Formula (1-1)

[C 2]

In the above formula, $R_1$ to $R_3$ represent an alkyl group having 1 to 20 carbon atoms, and X represents a divalent linking group.

The betaine-based surfactant used in the ink composition of the present embodiment is preferably a betaine-based surfactant represented by the following formula (1-2) in terms of improving fixation of the ink composition to a printed article.

Formula (1-2)

[C 3]

The content of the betaine-based surfactant used in the ink composition of the present embodiment is preferably 0.6 to 1.0% by weight based on the total weight of the ink composition.

[Linear Saturated Aliphatic Alcohol Having a Hydroxyl Value of 1 to 2 and 4 to 6 Carbon Atoms]

In the present embodiment, a "linear saturated aliphatic alcohol" refers to an alcohol having a linear saturated aliphatic backbone and a hydroxyl group, and the hydroxyl group may be bonded to any of the carbon atoms that compose the saturated hydrocarbon backbone.

Examples of the linear saturated aliphatic alcohol having a hydroxyl value of 1 to 2 and 4 to 6 carbon atoms used in the ink composition of the present embodiment include monovalent linear saturated aliphatic alcohols such as 1-butyl alcohol, 2-butyl alcohol, 1-pentyl alcohol, 2-pentyl alcohol, 3-pentyl alcohol or 1-hexyl alcohol; or divalent linear saturated aliphatic alcohols such as 1,2-hexanediol, and these may be used alone or two or more types may be used in combination.

Among these, linear saturated aliphatic alcohols having a hydroxyl value of 1 and 5 to 6 carbon atoms are particularly preferable from the viewpoint of foaming and defoaming properties. Examples of such alcohols include 2-pentyl alcohol, 3-pentyl alcohol and 1-hexyl alcohol, and these may be used alone or two or more types may be used in combination.

In the case of using, for example, ethyl alcohol or propyl alcohol having 3 carbon atoms or less for the linear saturated aliphatic alcohol, the hydrophilicity of the alcohol becomes excessively high, thereby preventing adequate foaming inhibitory and defoaming effects from being obtained. In addition, in the case of using, for example, heptyl alcohol or octyl alcohol having 7 carbon atoms or more, the hydrophilicity of the alcohol is excessively low, thereby making it difficult to add an amount that allows the obtaining of adequate foaming inhibitory and defoaming effects to the ink composition, and if the amount added is attempted to be increased despite this, the ink composition undergoes phase separation over time resulting in poor ink storageability.

In addition, in the case of using an alcohol having a hydroxyl value of 3 or more for the linear saturated aliphatic alcohol, defoaming properties are inadequate. It is necessary to take into consideration the hydrophobicity and hydrophilicity attributable to the number of carbon atoms and hydroxyl value of the linear saturated aliphatic alcohol in order to demonstrate defoaming and foaming inhibitory effects.

If the amount of the linear saturated aliphatic alcohol is excessively low, the defoaming effects of the ink composition decrease, while if the amount is excessively high, printing quality and storage stability are impaired. Consequently, in the present invention, the linear saturated aliphatic alcohol is preferably contained in the ink composition within the range of 0.25 to 3.00% by weight, and more preferably within the range of 0.50 to 3.00% by weight.

As a result of incorporating the betaine-based surfactant and the linear saturated aliphatic alcohol at a weight ratio of 1:5 to 1:0.25, an ink composition can be obtained having satisfactory balance in terms of having superior foaming inhibitory and defoaming effects and superior printing stability for the entire ink composition.

If the static surface tension of the ink composition in the present embodiment is excessively low, a stable discharge volume and projection form may not be obtained, while if the static surface tension is excessively high, generated bubbles may be difficult to dissipate. Thus, the static surface tension is preferably within the range of 20 to 40 mN/m, and more preferably within the range of 26 to 34 mN/m. Furthermore, static surface tension in the present invention refers to the value measured using a commercially available Wilhelmi surface tensiometer according to a method complying with JIS K 3362.

Moreover, since discharge stability decreases if the viscosity of the ink composition in the present embodiment at 20° C. is excessively low or excessively high, it is preferably within the range of 2 to 10 mPa·s, and more preferably within the range of 3.5 to 4.5 mPa·s. Furthermore, this viscosity can be measured with a commercially available viscometer and the like.

[Colorant]

A water-soluble dye or pigment can be used for the colorant in the present invention provided it can be used in an ordinary ink jet recording method.

There are no particular limitations on the type of dye, and acidic dyes, direct dyes, reactive dyes or basic dyes can be used, examples of which include C.I. Acid Yellow 17, 23, 42, 44, 79 or 142, C.I. Acid Red 52, 80, 82, 249, 254 or 289, C.I. Acid Blue 9, 45 or 249, C.I. Acid Black 1, 2, 24 or 94, C.I. Food Black 1 or 2, C.I. Direct Yellow 1, 12, 24, 33, 50, 55, 58, 86, 132, 142, 144 or 173, C.I. Direct Red 1, 4, 9, 80, 81, 225 or 227, C.I. Direct Blue 1, 2, 15, 71, 86, 87, 98, 165, 199 or 202, C.I. Direct Black 19, 38, 51, 71, 154, 168, 171 of 195, C.I. Reactive Red 14, 32, 55, 79 or 249, and C.I. Reactive Black 3, 4 or 35.

A magenta dye represented by the following general formula (2) can also be used for the colorant.

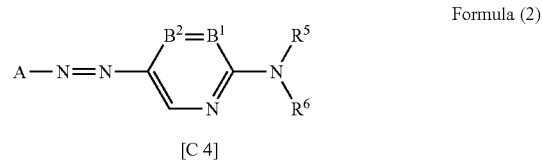

Formula (2)

[C 4]

In the above formula, A represents a residue of a five-member heterocyclic diazo component A-$NH_2$. $B^1$ and $B^2$ respectively represent —$CR^1$= or —$CR^2$= or one represents a nitrogen atom and the other represents —$CR^1$= or —$CR^3$=.

$R^5$ and $R^6$ respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent.

G, $R^1$ and $R^2$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryloxycarbonylamino group, alkyl and arylsulfonylamino group, aryloxycarbonylamino group, nitro group, alkyl and arylthio group, alkyl and arylsulfonyl group, alkyl and arylsulfinyl group, sulfamoyl group, sulfo group or heterocyclic thio group. Each group may be further substituted.

In addition, $R^1$ and $R^5$ or $R^1$ and $R^3$ may be bonded to form a five-to six-member ring.

The magenta dye represented by the general formula (2) is preferably a magenta dye represented by the following general formula (3) from the viewpoint of light resistance and ozone resistance.

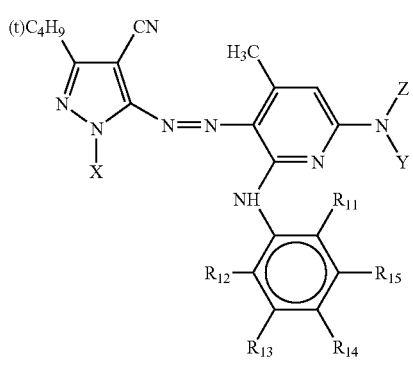

Formula (3)

[C 5]

In the above formula, $R_{11}$ and $R_{12}$ respectively and independently an alkyl group, alkoxy group or halogen atom, the total number of carbon atoms that compose the alkyl groups is 3 or more when $R_{11}$ and $R_{12}$ are both alkyl groups, and these groups may be further substituted. $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted. In addition, $R_{11}$ and $R_{15}$ or $R_{12}$ and $R_{13}$ may be mutually condensed into a ring.

X represents a hydrogen atom, aliphatic group, aromatic group or heterocyclic group, and Y and Z respectively and independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent.

In addition, the magenta dye represented by the general formula (2) is more preferably a magenta dye represented by the following general formula (4) from the viewpoint of light resistance and ozone resistance.

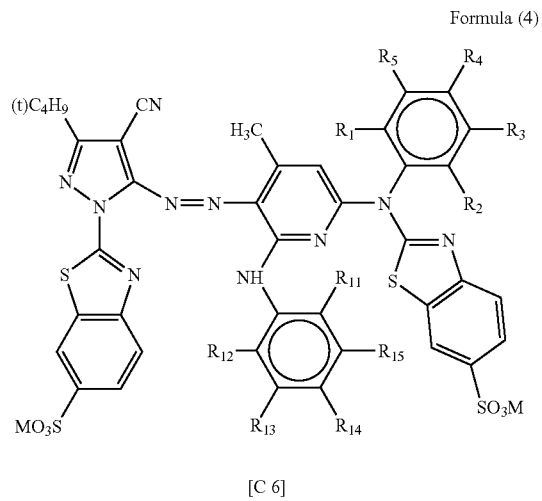

Formula (4)

[C 6]

In the above formula, $R_1$ and $R_2$ respectively and independently represent an alkyl group, alkoxy group or halogen atom, the total number of carbon atoms that compose the alkyl groups is 3 or more when both $R_1$ and $R_2$ are alkyl groups, and these groups may be further substituted. $R_3$, $R_4$ and $R_5$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted. In addition, $R_1$ and $R_5$ or $R_2$ and $R_3$ may be mutually condensed into a ring.

$R_{11}$ and $R_{12}$ respectively and independently represent an alkyl group, alkoxy group or halogen atom, the total number of carbon atoms that compose the alkyl groups is 3 or more when $R_{11}$ and $R_{12}$ are both alkyl groups, and these may be further substituted. $R_{13}$, $R_{14}$ and $R_{15}$ respectively and independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group. Each group may be further substituted. In addition, $R_{11}$ and $R_{15}$ or $R_{12}$ and $R_{13}$ may be mutually condensed into a ring. M represents hydrogen, lithium, sodium, potassium, ammonium or an organic amine.

In addition, the magenta dye represented by the general formula (2) is more preferably a magenta dye represented by the following formula (5) from the viewpoint of light resistance, ozone resistance and solubility in water.

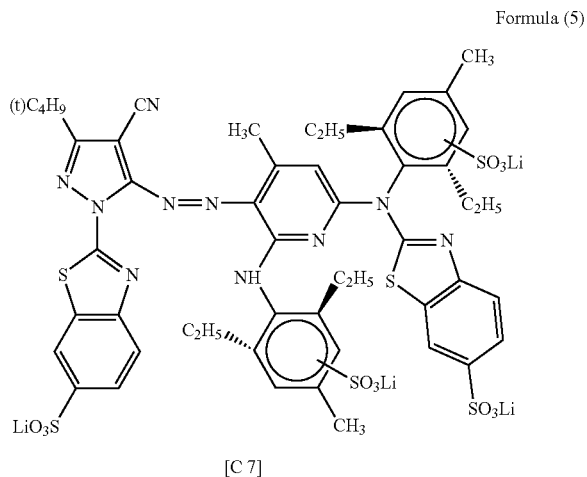

Formula (5)

[C 7]

The content of the magenta dye is preferably 0.50 to 5.00% by weight based on the total weight of the ink composition from the viewpoint of obtaining adequate color density and maintaining clogging reliability.

In addition, by incorporating the magenta dye and the betaine-based surfactant at a weight ratio of 1:1.2 to 1:0.2, an ink composition can be obtained having satisfactory balance in terms of having superior image durability (such as light resistance and moisture resistance) and adequate clogging recoverability.

[Other Ink Components]

Moreover, in the present embodiment, a nonionic surfactant, anionic surfactant and cationic surfactant may be contained in addition to the betaine-based surfactant described above, and a nonionic surfactant is particularly preferably contained from the viewpoint of obtaining an ink composition having suitable static surface tension.

More specific examples of nonionic surfactants include acetylene glycol-based surfactants, acetylene alcohol-based surfactants, ether-based surfactants such as polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether or polyoxyalkylene alkyl ether, polyoxyethylene oleic acid, ester-based surfactants such as polyoxyethylene oleic acid ester, polyoxyethylene distearic acid ester, sorbitan laurate, sorbitan monostearate, sorbitan monooleate, sorbitan sesquioleate, polyoxyethylene monooleate or polyoxyethylene stearate, silicon-based surfactants such as dimethylpolysiloxane, and fluorine-containing surfactants such as fluoroalkylesters and perfluoroalkyl carboxylates.

Furthermore, these nonionic surfactants are preferably contained at 0.1 to 5% by weight in the ink composition from the viewpoint of obtaining an ink composition having suitable static surface tension.

In addition, among the above-mentioned nonionic surfactants, acetylene alcohol-based surfactants are particularly preferable since they exhibit little foaming and have superior defoaming performance.

Although more specific examples of acetylene alcohol-based surfactants include 2,4,7,9-tetramethyl-5-decene-4,7-diol, 3,6-dimethyl-4-octene-3,6-diol and 3,5-dimethyl-1-hexene-3-ol, these surfactants can be also be acquired in the form of commercially available products, examples of which include Saffinol 104, 82, 465, 485 or TG manufactured by Air Products Japan Inc. and Olfine STG or Olfine E1010 manufactured by Nissin Chemical Industry Co., Ltd.

Moreover, the ink composition of the present embodiment may also contain a permeation promoter. There are no particular limitations on the permeation promoter used in the ink composition of the present embodiment, and glycol ethers are particularly preferable.

Specific examples of glycol ethers include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol monoisopropyl ether, diethylene glycol monoisopropyl ether, ethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol monoisobutyl ether, dipropylene glycol monomethyl ether, dipropylene glycol monoethyl ether, dipropylene glycol mono-n-propyl ether and dipropylene glycol monoisopropyl ether, and one type of these glycol ethers may be used or two or more types may be used as a mixture.

Furthermore, these permeation promoters are preferably added to the ink composition in amount within the range of 0.25 to 10% by weight from the viewpoint of securing proper physical property values (such as viscosity) of the ink composition and securing printing quality and reliability.

A pH adjuster, antioxidant, ultraviolet absorber, antiseptic/antimold agent and the like can be added to the ink composition of the present embodiment as described above as necessary.

Examples of pH adjusters that can be used include alkaline metal hydroxides such as lithium hydroxide, potassium hydroxide or sodium hydroxide, and amines such as ammonia, triethanolamine, tripropanolamine, diethanolamine or monoethanolamine. In addition, collidine, imidazole, phosphoric acid, 3-(N-morpholino)propane sulfonate, tris(hydroxymethyl)aminomethane or boric acid and the like can be used as a pH buffer as necessary.

Examples of antioxidants and ultraviolet absorbers used include alohanates such as alohanate or methyl alohanate, biurets such as biuret, dimethyl biuret or tetramethyl biuret and L-ascorbic acid and salts thereof, as well as Tinuvin 328, 900, 1130, 384, 292, 123, 144, 622, 770 or 292, Irgacor 252 or 153, or Irganox 1010, 1076, 1035 or MD1024 all manufactured by Ciba Geigy Co., Ltd., and lanthanide oxides.

Examples of antiseptics and antimold agents include sodium benzoate, sodium pentachlorophenol, sodium 2-pyridinethiol-1-oxide, sodium sorbate, sodium dehydroacetate and 1,2-dibenzisothiazolin-3-one (Proxel CRL, Proxel BDN, Proxel GXL, Proxel XL-2 or Proxel TN available from Avecia Biologics Ltd.).

In addition, the main solvent contained in the ink composition of the present embodiment is water. Pure water or ultra-pure water and the like such as ion exchange water, ultrafiltration water, reverse osmosis water or distilled water can be used for this water. The use of water that has been sterilized by ultraviolet irradiation or addition of hydrogen peroxide and the like is particularly preferable in terms of allowing the ink composition to be stored for a long period of time by preventing growth of mold and bacteria.

[Ink Jet Recording Method]

Although the ink composition of the present embodiment can be preferably used in a writing instrument such as a pen or in a stamp and the like, it can be used more preferably in an ink jet recording method in which droplets of the ink composition are discharged and the droplets are adhered to a recording medium. Here, an "ink jet recording method" refers to a method in which an ink composition is discharged from a fine nozzle in the form of liquid droplets and the droplets are adhered to a recording medium, specific examples of which are described below.

A first example of an ink jet recording method is an electrostatic attraction method. In this method, a strong electric field is applied between a nozzle and acceleration electrodes placed in front of the nozzle, ink in the form of droplets is sprayed continuously from the nozzle, and a printing information signal is applied to deflection electrodes and recorded during the time the ink droplets are projected between the deflection electrodes, or the ink droplets may be sprayed corresponding to the printing information signal without being deflected.

A second example involves applying pressure to the ink droplets with a small pump and forcibly spraying the ink droplets by mechanically oscillating the nozzle with a crystal unit and the like. In this method, the sprayed ink droplets are charged simultaneous to being sprayed, and a printing information signal is applied to deflection electrodes and recorded during the time the ink droplets are projected between the deflection electrodes.

A third example is a method that uses a piezoelectric device (piezo device). In this method, recording is carried out by applying pressure to the ink liquid with a piezoelectric device simultaneous to the application of a printing information signal followed by spraying the ink droplets.

A fourth example is a method in which ink liquid is made to rapidly swell in volume due to the action of thermal energy. In this method, recording is carried out by heating and foaming the ink liquid with microelectrodes according to a printing information signal followed by spraying the ink droplets.

Any of these methods can be used for the ink jet recording method that uses the ink of the present embodiment, and the ink can be filled into each type of ink jet cartridge.

In addition, examples of a "recording medium" as referred to in the present embodiment include, but are not particularly limited to paper (such as Xerox P (trade name: Fuji Xerox Co., Ltd.), Xerox 4024 (trade name: Xerox Co. (USA)) or Crispia Photographic Paper <High Gloss> (trade name: Seiko Epson Corp.)).

[Recorded Article]

A recorded article of the present embodiment is that on which recording has been carried out by the ink jet recording method described above using the previously described ink composition. Since this recorded article is obtained by the above-mentioned ink jet recording method using the previously described ink composition, it has satisfactory printing quality, demonstrates superior printing stability, demonstrates attractive color development and is able to maintain the attractive color development over a long period of time.

EXAMPLE A

Examples 1 to 26 and Comparative Examples 1 to 24

The ink compositions of Examples 1 to 26 and Comparative Examples 1 to 24 were prepared by mixing and dissolving each component at the formulation ratios shown in Tables 1 to 4 followed by subjecting to pressure filtration with a PTFE (polytetrafluoroethylene) filter having a pore diameter of 1 μm.

Furthermore, each component of the ink compositions shown in Tables 1 to 4 is indicated as the percent by weight of each component based on the total weight of the ink composition, and the balance of each composition is comprised of water.

In Tables 1 to 4, [1a] represents C.I. Acid Red 52, [1b] C.I. Direct Yellow 132, [2] a betaine-based surfactant represented by formula (1-2), [3] triethylene glycol monobutyl ether, [4] an acetylene glycol-based surfactant manufactured by Nissin Chemical Industry Co., Ltd., [5] an antiseptic/antimold agent manufactured by Arch Chemicals, Inc. and [6] disodium dihydrogen ethylenediamine tetraacetate.

TABLE 1

| Material | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Compound 1 [1a] | 2.00 | 2.00 | 2.00 | 2.00 | | | | | | | | | |
| Compound 2 [1b] | | | | | 2.00 | 2.00 | 2.00 | 2.00 | 2.00 | 2.00 | 2.00 | 2.00 | 2.00 |
| Betaine-based surfactant [2] | 1.00 | 1.00 | 1.00 | 1.00 | 1.00 | 1.00 | 1.00 | 1.00 | 1.00 | 1.00 | 1.00 | 1.00 | 1.00 |
| TEGmBE [3] | 9.00 | 9.00 | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 | 3.20 | 3.20 |
| Olfine E1010 [4] | 0.70 | 0.70 | 0.70 | 0.70 | 0.70 | 0.70 | 0.70 | 0.70 | 0.70 | 0.70 | 0.70 | 0.70 | 0.70 |
| Olfine PD002W [4] | 0.10 | 0.10 | 0.10 | 0.10 | 0.10 | 0.10 | 0.10 | 0.10 | 0.10 | 0.10 | 0.10 | 0.10 | 0.10 |
| Triethanolamine | 0.40 | 0.40 | 0.40 | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 | 5.00 | 5.00 | 5.00 |

TABLE 1-continued

| Material | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Benzo-triazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 | 0.30 | 0.30 |
| EDTA [6] | 0.02 | 0.02 | 0.02 | 0.02 | 0.02 | 0.02 | 0.02 | 0.02 | 0.02 | 0.02 | 0.02 | 0.02 | 0.02 |
| 1-propanol | | | | | | | | | | | | | |
| 2-propanol | | | | | | | | | | | | | |
| 1-butyl alcohol | 1.00 | 0.25 | | | | | | | | | | | |
| 2-butyl alcohol | | | 1.00 | 0.25 | | | | | | | | | |
| 1-pentyl alcohol | | | | | 1.00 | 0.25 | | | | | | | |
| 2-pentyl alcohol | | | | | | | 1.00 | 0.25 | | | | | |
| 3-pentyl alcohol | | | | | | | | | 1.00 | 0.25 | | | |
| 1-hexyl alcohol | | | | | | | | | | | 1.00 | 0.25 | |
| 1-heptanol | | | | | | | | | | | | | |
| 2-heptanol | | | | | | | | | | | | | |
| 3-heptanol | | | | | | | | | | | | | |
| 4-heptanol | | | | | | | | | | | | | |
| 1,3-propane-diol | | | | | | | | | | | | | |
| 1,2-hexane-diol | | | | | | | | | | | | | 3.00 |
| 1,2-heptane-diol | | | | | | | | | | | | | |
| 1,7-heptane-diol | | | | | | | | | | | | | |
| 1,2,4-butane-triol | | | | | | | | | | | | | |
| 1,2,6-hexane-triol | | | | | | | | | | | | | |
| Water | 68.27 | 69.02 | 68.27 | 69.02 | 68.27 | 69.02 | 68.27 | 69.02 | 68.27 | 69.02 | 68.27 | 69.02 | 66.27 |
| Total | 100.00 | 100.00 | 100.00 | 100.00 | 100.00 | 100.00 | 100.00 | 100.00 | 100.00 | 100.00 | 100.00 | 100.00 | 100.00 |

TABLE 2

| Material | Examples | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Compound 1 [1a] | 0.60 | 0.60 | 0.60 | 0.60 | | | | | | | | | |
| Compound 2 [1b] | | | | | 0.60 | 0.60 | 0.60 | 0.60 | 0.60 | 0.60 | 0.60 | 0.60 | 0.60 |
| Betaine-based surfactant [2] | 0.60 | 0.60 | 0.60 | 0.60 | 0.60 | 0.60 | 0.60 | 0.60 | 0.60 | 0.60 | 0.60 | 0.60 | 0.60 |
| TEGmBE [3] | 9.00 | 9.00 | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 | 3.50 | 3.50 |
| Olfine E1010 [4] | 0.40 | 0.40 | 0.40 | 0.40 | 0.40 | 0.40 | 0.40 | 0.40 | 0.40 | 0.40 | 0.40 | 0.40 | 0.40 |
| Olfine PD002W [4] | 0.40 | 0.40 | 0.40 | 0.40 | 0.40 | 0.40 | 0.40 | 0.40 | 0.40 | 0.40 | 0.40 | 0.40 | 0.40 |
| Urea | 4.00 | 4.00 | 4.00 | 4.00 | 4.00 | 4.00 | 4.00 | 4.00 | 4.00 | 4.00 | 4.00 | 4.00 | 4.00 |
| Benzo-triazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 | 0.30 | 0.30 |

TABLE 2-continued

| Material | Examples | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| EDTA [6] | 0.02 | 0.02 | 0.02 | 0.02 | 0.02 | 0.02 | 0.02 | 0.02 | 0.02 | 0.02 | 0.02 | 0.02 | 0.02 |
| 1-propanol | | | | | | | | | | | | | |
| 2-propanol | | | | | | | | | | | | | |
| 1-butyl alcohol | 1.00 | 0.25 | | | | | | | | | | | |
| 2-butyl alcohol | | | 1.00 | 0.25 | | | | | | | | | |
| 1-pentyl alcohol | | | | | 1.00 | 0.25 | | | | | | | |
| 2-pentyl alcohol | | | | | | | 1.00 | 0.25 | | | | | |
| 3-pentyl alcohol | | | | | | | | | 1.00 | 0.25 | | | |
| 1-hexyl alcohol | | | | | | | | | | | 1.00 | 0.25 | |
| 1-heptanol | | | | | | | | | | | | | |
| 2-heptanol | | | | | | | | | | | | | |
| 3-heptanol | | | | | | | | | | | | | |
| 4-heptanol | | | | | | | | | | | | | |
| 1,3-propanediol | | | | | | | | | | | | | |
| 1,2-hexanediol | | | | | | | | | | | | | 3.00 |
| 1,2-heptanediol | | | | | | | | | | | | | |
| 1,7-heptanediol | | | | | | | | | | | | | |
| 1,2,4-butanetriol | | | | | | | | | | | | | |
| 1,2,6-hexanetriol | | | | | | | | | | | | | |
| Water | 67.17 | 67.92 | 67.17 | 67.92 | 67.17 | 67.92 | 67.17 | 67.92 | 67.17 | 67.92 | 67.17 | 67.92 | 65.17 |
| Total | 100.00 | 100.00 | 100.00 | 100.00 | 100.00 | 100.00 | 100.00 | 100.00 | 100.00 | 100.00 | 100.00 | 100.00 | 100.00 |

TABLE 3

| Material | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compound 1 [1a] | 2.00 | 2.00 | 2.00 | | | | | | | | | |
| Compound 2 [1b] | | | | 2.00 | 2.00 | 2.00 | 2.00 | 2.00 | 2.00 | 2.00 | 2.00 | 2.00 |
| Betaine-based surfactant [2] | 1.00 | 1.00 | 1.00 | 1.00 | 1.00 | 1.00 | 1.00 | 1.00 | 1.00 | 1.00 | 1.00 | 1.00 |
| TEGmBE [3] | 9.00 | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 | 3.20 |
| Olfine E1010 [4] | 0.70 | 0.70 | 0.70 | 0.70 | 0.70 | 0.70 | 0.70 | 0.70 | 0.70 | 0.70 | 0.70 | 0.70 |
| Olfine PD002W [4] | 0.10 | 0.10 | 0.10 | 0.10 | 0.10 | 0.10 | 0.10 | 0.10 | 0.10 | 0.10 | 0.10 | 0.10 |
| Triethanolamine | 0.40 | 0.40 | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 | 5.00 | 5.00 |
| Benzotriazole | 0.01 | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 | 0.30 |
| EDTA [6] | 0.02 | 0.02 | 0.02 | 0.02 | 0.02 | 0.02 | 0.02 | 0.02 | 0.02 | 0.02 | 0.02 | 0.02 |
| 1-propanol | | 1.00 | | | | | | | | | | |
| 2-propanol | | | 1.00 | | | | | | | | | |

TABLE 3-continued

| | Comparative Examples | | | | | | | | | | | |
|---|---|---|---|---|---|---|---|---|---|---|---|---|
| Material | 1 | 2 | 3 | 4 | 5 | 6 | 7 | 8 | 9 | 10 | 11 | 12 |
| 1-butyl alcohol | | | | | | | | | | | | |
| 2-butyl alcohol | | | | | | | | | | | | |
| 1-pentyl alcohol | | | | | | | | | | | | |
| 2-pentyl alcohol | | | | | | | | | | | | |
| 3-pentyl alcohol | | | | | | | | | | | | |
| 1-hexyl alcohol | | | | | | | | | | | | |
| 1-heptanol | | | | 0.10 | | | | | | | | |
| 2-heptanol | | | | | 0.10 | | | | | | | |
| 3-heptanol | | | | | | 0.10 | | | | | | |
| 4-heptanol | | | | | | | 0.10 | | | | | |
| 1,3-propanediol | | | | | | | | 3.00 | | | | |
| 1,2-hexanediol | | | | | | | | | | | | |
| 1,2-heptanediol | | | | | | | | | 3.00 | | | |
| 1,7-heptanediol | | | | | | | | | | 3.00 | | |
| 1,2,4-butanetriol | | | | | | | | | | | 3.00 | |
| 1,2,6-hexanetriol | | | | | | | | | | | | 3.00 |
| Water | 69.27 | 68.27 | 68.27 | 69.17 | 69.17 | 69.17 | 69.17 | 66.27 | 66.27 | 66.27 | 66.27 | 66.27 |
| Total | 100.00 | 100.00 | 100.00 | 100.00 | 100.00 | 100.00 | 100.00 | 100.00 | 100.00 | 100.00 | 100.00 | 100.00 |

TABLE 4

| | Comparative Examples | | | | | | | | | | | |
|---|---|---|---|---|---|---|---|---|---|---|---|---|
| Material | 13 | 14 | 15 | 16 | 17 | 18 | 19 | 20 | 21 | 22 | 23 | 24 |
| Compound 1 [1a] | 0.60 | 0.60 | 0.60 | | | | | | | | | |
| Compound 2 [1b] | | | | 0.60 | 0.60 | 0.60 | 0.60 | 0.60 | 0.60 | 0.60 | 0.60 | 0.60 |
| Betaine-based surfactant [2] | 0.60 | 0.60 | 0.60 | 0.60 | 0.60 | 0.60 | 0.60 | 0.60 | 0.60 | 0.60 | 0.60 | 0.60 |
| TEGmBE [3] | 9.00 | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 | 3.50 |
| Olfine E1010 [4] | 0.40 | 0.40 | 0.40 | 0.40 | 0.40 | 0.40 | 0.40 | 0.40 | 0.40 | 0.40 | 0.40 | 0.40 |
| Olfine PD002W [4] | 0.40 | 0.40 | 0.40 | 0.40 | 0.40 | 0.40 | 0.40 | 0.40 | 0.40 | 0.40 | 0.40 | 0.40 |
| Urea | 4.00 | 4.00 | 4.00 | 4.00 | 4.00 | 4.00 | 4.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 | 0.01 |
| Proxel XL-2 [5] | 0.30 | 0.30 | 0.30 | 0.30 | 0.30 | 0.30 | 0.30 | 0.30 | 0.30 | 0.30 | 0.30 | 0.30 |
| EDTA [6] | 0.02 | 0.02 | 0.02 | 0.02 | 0.02 | 0.02 | 0.02 | 0.02 | 0.02 | 0.02 | 0.02 | 0.02 |
| 1-propanol | | 1.00 | | | | | | | | | | |
| 2-propanol | | | 1.00 | | | | | | | | | |
| 1-butyl alcohol | | | | | | | | | | | | |
| 2-butyl alcohol | | | | | | | | | | | | |

TABLE 4-continued

| Material | Comparative Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| 1-pentyl alcohol | | | | | | | | | | | | |
| 2-pentyl alcohol | | | | | | | | | | | | |
| 3-pentyl alcohol | | | | | | | | | | | | |
| 1-hexyl alcohol | | | | | | | | | | | | |
| 1-heptanol | | | | 0.10 | | | | | | | | |
| 2-heptanol | | | | | 0.10 | | | | | | | |
| 3-heptanol | | | | | | 0.10 | | | | | | |
| 4-heptanol | | | | | | | 0.10 | | | | | |
| 1,3-propanediol | | | | | | | | 3.00 | | | | |
| 1,2-hexanediol | | | | | | | | | | | | |
| 1,2-heptanediol | | | | | | | | | 3.00 | | | |
| 1,7-heptanediol | | | | | | | | | | 3.00 | | |
| 1,2,4-butanetriol | | | | | | | | | | | 3.00 | |
| 1,2,6-hexanetriol | | | | | | | | | | | | 3.00 |
| Water | 68.17 | 67.17 | 67.17 | 68.07 | 68.07 | 68.07 | 68.07 | 65.17 | 65.17 | 65.17 | 65.17 | 65.17 |
| Total | 100.00 | 100.00 | 100.00 | 100.00 | 100.00 | 100.00 | 100.00 | 100.00 | 100.00 | 100.00 | 100.00 | 100.00 |

Bubbling (foaming) and debubbling (defoaming) were evaluated by observing visually and observing changes in bubble height over time. More specifically, 10 g of the ink formulations of each of the examples and comparative examples were sealed in a cylindrical glass container having a diameter of 2 cm and height of 10 cm and mixed by shaking 50 times followed by evaluating foaming by measuring the height (H) from the interface between the bubbles and the liquid to the maximum height of the bubbles, and evaluating defoaming based on the time until the height (H) from the interface between the bubbles and the liquid to the maximum height of the bubbles reached 0.5H. (The experiment was carried out at an atmospheric temperature of 23 to 24° C.)

The results are shown in Tables 5 and 6. Seven types of alcohols consisting of 1-butyl alcohol, 2-butyl alcohol, 1-pentyl alcohol, 2-pentyl alcohol, 3-pentyl alcohol, 1-hexyl alcohol and 1,2-hexandiol demonstrated improved foaming and defoaming properties.

Among these, the five types of alcohols consisting of 1-pentyl alcohol, 2-pentyl alcohol, 3-pentyl alcohol, 1-hexyl alcohol and 1,2-hexanediol demonstrated greatly improved foaming and defoaming properties in particular.

TABLE 5

| Composition | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Foaming [1] (cm) | 9 | 9 | 9 | 7 | 7 | 7 | 6 | 8 | 8 | 7 | 7 | 8 |
| Defoaming [2] (min.) | 28 | 21 | 19 | 24 | 26 | 27 | 23 | 20 | 22 | 23 | 22 | 21 |

TABLE 5-continued

| Composition | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Foaming [1] (cm) | 7 | 7 | 7 | 7 | 4 | 6 | 5 | 6 | 5 | 6 | 4 | 5 | 6 |
| Defoaming [2] (min.) | 8 | 12 | 8 | 12 | 3 | 5 | 3 | 5 | 3 | 5 | 2 | 4 | 4 |

Experiment Conditions 10 g of sample ink were sealed in a cylindrical glass container having a diameter of 2 cm and height of 10 cm and mixed by shaking manually.

The experiment was carried out at a room temperature of 20 to 25° C.

[1] Result of measuring the height of bubbles formed immediately after manual shaking in cm units.

[2] Result of measuring amount of time required for the number of bubbles formed to decrease by half in minute units.

TABLE 6

| Composition | Comparative Examples | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Foaming [1] (cm) | 9 | 8 | 8 | 6 | 6 | 6 | 7 | 7 | 8 | 6 | 7 | 8 |
| Defoaming [2] (min.) | 24 | 18 | 18 | 21 | 22 | 19 | 20 | 20 | 21 | 21 | 22 | 23 |

TABLE 6-continued

| Compo- | Examples | | | | | | | | | | | | |
|---|---|---|---|---|---|---|---|---|---|---|---|---|---|
| sition | 14 | 15 | 16 | 17 | 18 | 19 | 20 | 21 | 22 | 23 | 24 | 25 | 26 |
| Foaming [1] (cm) | 5 | 6 | 5 | 6 | 4 | 5 | 4 | 5 | 4 | 5 | 3 | 4 | 5 |
| Defoaming [2] (min.) | 8 | 10 | 8 | 10 | 2 | 4 | 2 | 5 | 2 | 4 | 1 | 2 | 2 |

Experiment Conditions
  10 g of sample ink were sealed in a cylindrical glass container having a diameter of 2 cm and height of 10 cm and mixed by shaking manually.
  The experiment was carried out at a room temperature of 20 to 25° C.
[1] Result of measuring the height of bubbles formed immediately after manual shaking in cm units.
[2] Result of measuring amount of time required for the number of bubbles formed to decrease by half in minute units.

As a result of filling the ink compositions described in the above-mentioned examples into special-purpose cartridges and printing onto a dedicated ink jet recording medium (Crispia Photographic Paper <High Gloss> (Seiko Epson Corp.)) using the PM-A700 Ink Jet Printer (Seiko Epson Corp.), printing was able to be carried out satisfactorily.

EXAMPLE B

[Preparation of Ink Composition]
  Each ink composition (Examples 1 to 26 and Comparative Examples 1 to 54) was prepared by mixing and dissolving each component at the formulation ratios shown in Tables 7 to 9 followed by subjecting to pressure filtration with a PTFE (polytetrafluoroethylene) filter having a pore diameter of 1 μm.
  Furthermore, each component of the ink compositions shown in Tables 7 to 9 is indicated as the percent by weight of each component based on the total weight of the ink composition, and the balance of each composition is comprised of water.
  In Tables 7 to 9, [1] represents a magenta dye represented by formula (5), [2] represents a magenta dye represented by the following formula (8), [3] represents a betaine-based surfactant represented by formula (1-2), [4] represents triethylene glycol monobutyl ether, [5] represents an acetylenediol-based surfactant manufactured by Nissin Chemical Industry Co., Ltd., [6] represents an antiseptic/anti-mold agent manufactured by Arch Chemicals, Inc. and [7] represents disodium dihydrogen ethylenediamine tetraacetate dehydrate.

TABLE 7

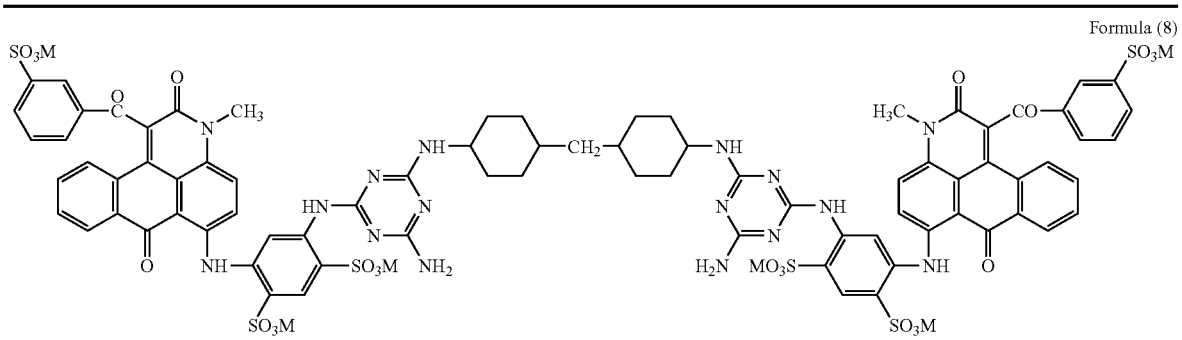

Formula (8)

(M = NH$_4$ or Na)

[C 8]

| Ink Composition | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Magenta dye [1] | 5.00 | 5.00 | 5.00 | 5.00 | 5.00 | 5.00 | 5.00 | 5.00 | 5.00 | 5.00 | 5.00 | 5.00 | 5.00 |
| Magenta dye 2 [2] | | | | | | | | | | | | | |
| Betaine-based surfactant [3] | 1.00 | 1.00 | 1.00 | 1.00 | 1.00 | 1.00 | 1.00 | 1.00 | 1.00 | 1.00 | 1.00 | 1.00 | 1.00 |
| TEGmBE [4] | 9.00 | 9.00 | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 | 3.20 | 3.20 |
| Olfine E1010 [5] | 0.70 | 0.70 | 0.70 | 0.70 | 0.70 | 0.70 | 0.70 | 0.70 | 0.70 | 0.70 | 0.70 | 0.70 | 0.70 |
| Olfine PD002W [5] | 0.10 | 0.10 | 0.10 | 0.10 | 0.10 | 0.10 | 0.10 | 0.10 | 0.10 | 0.10 | 0.10 | 0.10 | 0.10 |
| Triethanolamine | 0.40 | 0.40 | 0.40 | 0.40 | 0.40 | 0.40 | 0.40 | 0.40 | 0.40 | 0.40 | 0.40 | 0.40 | 0.40 |

TABLE 7-continued

| | | | | | | | | | | | | | |
|---|---|---|---|---|---|---|---|---|---|---|---|---|---|
| Urea | 5.00 | 5.00 | 5.00 | 5.00 | 5.00 | 5.00 | 5.00 | 5.00 | 5.00 | 5.00 | 5.00 | 5.00 | 5.00 |
| Benzotriazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 | 0.02 | 0.02 |
| 1-propanol | | | | | | | | | | | | | |
| 2-propanol | | | | | | | | | | | | | |
| 1-butyl alcohol | 1.00 | 0.25 | | | | | | | | | | | |
| 2-butyl alcohol | | | 1.00 | 0.25 | | | | | | | | | |
| 1-pentyl alcohol | | | | | 1.00 | 0.25 | | | | | | | |
| 2-pentyl alcohol | | | | | | | 1.00 | 0.25 | | | | | |
| 3-pentyl alcohol | | | | | | | | | 1.00 | 0.25 | | | |
| 1-hexyl alcohol | | | | | | | | | | | 1.00 | 0.25 | |
| 1-heptanol | | | | | | | | | | | | | |
| 2-heptanol | | | | | | | | | | | | | |
| 3-heptanol | | | | | | | | | | | | | |
| 4-heptanal | | | | | | | | | | | | | |
| 1,3-propanediol | | | | | | | | | | | | | |
| 1,2-hexanediol | | | | | | | | | | | | | 3.00 |
| 1,2-heptanediol | | | | | | | | | | | | | |
| 1,7-heptanediol | | | | | | | | | | | | | |
| 1,2,4-butanetrial | | | | | | | | | | | | | |
| 1,2,6-hexanetriol | | | | | | | | | | | | | |
| Water | 65.27 | 66.02 | 65.27 | 66.02 | 65.27 | 66.02 | 65.27 | 66.02 | 65.27 | 66.02 | 65.27 | 66.02 | 63.27 |
| Total | 100.00 | 100.00 | 100.00 | 100.00 | 100.00 | 100.00 | 100.00 | 100.00 | 100.00 | 100.00 | 100.00 | 100.00 | 100.00 |

| Ink Composition | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Magenta dye [1] | 5.00 | 5.00 | 5.00 | 5.00 | 5.00 | 5.00 | 5.00 | 5.00 | 5.00 | 5.00 | 5.00 | 5.00 | 5.00 |
| Magenta dye 2 [2] | | | | | | | | | | | | | |
| Betaine-based surfactant [3] | 1.00 | | 1.00 | 1.00 | 1.00 | 1.00 | 1.00 | 1.00 | 1.00 | 1.00 | 1.00 | 1.00 | 1.00 |
| TEGmBE [4] | 9.00 | 9.00 | 9.00 | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 | 9.00 | 9.00 | 9.00 |
| 2-pyrrolidone | 3.20 | 3.20 | 3.20 | 3.20 | 3.20 | 3.20 | 3.20 | 3.20 | 3.20 | 3.20 | 3.20 | 3.20 | 3.20 |
| Olfine E1010 [5] | 0.70 | 0.70 | 0.70 | 0.70 | 0.70 | 0.70 | 0.70 | 0.70 | 0.70 | 0.70 | 0.70 | 0.70 | 0.70 |
| Olfine PD002W [5] | 0.10 | 0.10 | 0.10 | 0.10 | 0.10 | 0.10 | 0.10 | 0.10 | 0.10 | 0.10 | 0.10 | 0.10 | 0.10 |
| Triethanolamine | 0.40 | 0.40 | 0.40 | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 | 5.00 | 5.00 | 5.00 |
| Benzotriazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 | 0.02 | 0.02 |
| 1-propanol | | 1.00 | | | | | | | | | | | |
| 2-propanol | | | 1.00 | | | | | | | | | | |
| 1-butyl alcohol | | | | | | | | | | | | | |
| 2-butyl alcohol | | | | | | | | | | | | | |

TABLE 7-continued

| | | | | | | | | | | | | | |
|---|---|---|---|---|---|---|---|---|---|---|---|---|---|
| 1-pentyl alcohol | | | | | | | | | | | | | |
| 2-pentyl alcohol | | | | | | | | | | | | | |
| 3-pentyl alcohol | | | | | | | | | | | | | |
| 1-hexyl alcohol | | | | | | | | | | | | | |
| 1-heptanol | | | | | 0.10 | | | | | | | | |
| 2-heptanol | | | | | | 0.10 | | | | | | | |
| 3-heptanol | | | | | | | 0.10 | | | | | | |
| 4-heptanol | | | | | | | | 0.10 | | | | | |
| 1,3-propanediol | | | | | | | | | 3.00 | | | | |
| 1,2-hexanediol | | | | | | | | | | | | | |
| 1,2-heptanediol | | | | | | | | | | 3.00 | | | |
| 1,7-heptanediol | | | | | | | | | | | 3.00 | | |
| 1,2,4-butanetriol | | | | | | | | | | | | 3.00 | |
| 1,2,6-hexanetriol | | | | | | | | | | | | | 3.00 |
| Water | 66.27 | 67.27 | 65.27 | 65.27 | 66.17 | 66.17 | 66.17 | 66.17 | 63.27 | 63.27 | 63.27 | 63.27 | 63.27 |
| Total | 100.00 | 100.00 | 100.00 | 100.00 | 100.00 | 100.00 | 100.00 | 100.00 | 100.00 | 100.00 | 100.00 | 100.00 | 100.00 |

TABLE 8

| Ink Composition | Examples | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Magenta dye [1] | 0.50 | 0.50 | 0.50 | 0.50 | 0.50 | 0.50 | 0.50 | 0.50 | 0.50 | 0.50 | 0.50 | 0.50 | 0.50 |
| Magenta dye 2 [2] | | | | | | | | | | | | | |
| Betaine-based surfactant [3] | 0.60 | 0.60 | 0.60 | 0.60 | 0.60 | 0.60 | 0.60 | 0.60 | 0.60 | 0.60 | 0.60 | 0.60 | 0.60 |
| TEGmBE [4] | 9.00 | 9.00 | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 | 3.50 | 3.50 |
| Olfine E1010 [5] | 0.40 | 0.40 | 0.40 | 0.40 | 0.40 | 0.40 | 0.40 | 0.40 | 0.40 | 0.40 | 0.40 | 0.40 | 0.40 |
| Olfine PD002W [5] | 0.40 | 0.40 | 0.40 | 0.40 | 0.40 | 0.40 | 0.40 | 0.40 | 0.40 | 0.40 | 0.40 | 0.40 | 0.40 |
| Urea | 4.00 | 4.00 | 4.00 | 4.00 | 4.00 | 4.00 | 4.00 | 4.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 | 0.02 | 0.02 |
| 1-propanol | | | | | | | | | | | | | |
| 2-propanol | | | | | | | | | | | | | |
| 1-butyl alcohol | 1.00 | 0.25 | | | | | | | | | | | |
| 2-butyl alcohol | | | 1.00 | 0.25 | | | | | | | | | |
| 1-pentyl alcohol | | | | | 1.00 | 0.25 | | | | | | | |
| 2-pentyl alcohol | | | | | | | 1.00 | 0.25 | | | | | |
| 3-pentyl alcohol | | | | | | | | | 1.00 | 0.25 | | | |
| 1-hexyl alcohol | | | | | | | | | | | 1.00 | 0.25 | |

TABLE 8-continued

| | | | | | | | | | | | | | |
|---|---|---|---|---|---|---|---|---|---|---|---|---|---|
| 1-heptanol | | | | | | | | | | | | | |
| 2-heptanol | | | | | | | | | | | | | |
| 3-heptanol | | | | | | | | | | | | | |
| 4-heptanol | | | | | | | | | | | | | |
| 1,3-propanediol | | | | | | | | | | | | | |
| 1,2-hexanediol | | | | | | | | | | | | | 3.00 |
| 1,2-heptanediol | | | | | | | | | | | | | |
| 1,7-heptanediol | | | | | | | | | | | | | |
| 1,2,4-butanetriol | | | | | | | | | | | | | |
| 1,2,6-hexanetriol | | | | | | | | | | | | | |
| Water | 67.27 | 68.02 | 67.27 | 68.02 | 67.27 | 68.02 | 67.27 | 68.02 | 67.27 | 68.02 | 67.27 | 68.02 | 65.27 |
| Total | 100.00 | 100.00 | 100.00 | 100.00 | 100.00 | 100.00 | 100.00 | 100.00 | 100.00 | 100.00 | 100.00 | 100.00 | 100.00 |

| Ink | Comparative Examples | | | | | | | | | | | | |
|---|---|---|---|---|---|---|---|---|---|---|---|---|---|
| Composition | 14 | 15 | 16 | 17 | 18 | 19 | 20 | 21 | 22 | 23 | 24 | 25 | 26 |
| Magenta dye [1] | 0.50 | 0.50 | 0.50 | 0.50 | 0.50 | 0.50 | 0.50 | 0.50 | 0.50 | 0.50 | 0.50 | 0.50 | 0.50 |
| Magenta dye 2 [2] | | | | | | | | | | | | | |
| Betaine-based surfactant [3] | 0.60 | | 0.60 | 0.60 | 0.60 | 0.60 | 0.60 | 0.60 | 0.60 | 0.60 | 0.60 | 0.60 | 0.60 |
| TEGmBE [4] | 9.00 | 9.00 | 9.00 | 9.00 | 9.00 | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 | 13.00 | 13.00 | 13.00 | 13.00 | 13.00 |
| 2-pyrrolidone | 3.50 | 3.50 | 3.50 | 3.50 | 3.50 | 3.50 | 3.50 | 3.50 | 3.50 | 3.50 | 3.50 | 3.50 | 3.50 |
| Olfine E1010 [5] | 0.40 | 0.40 | 0.40 | 0.40 | 0.40 | 0.40 | 0.40 | 0.40 | 0.40 | 0.40 | 0.40 | 0.40 | 0.40 |
| Olfine PD002W [5] | 0.40 | 0.40 | 0.40 | 0.40 | 0.40 | 0.40 | 0.40 | 0.40 | 0.40 | 0.40 | 0.40 | 0.40 | 0.40 |
| Urea | 4.00 | 4.00 | 4.00 | 4.00 | 4.00 | 4.00 | 4.00 | 4.00 | 4.00 | 4.00 | 4.00 | 4.00 | 4.00 |
| Benzotriazole | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 | 0.02 | 0.02 | 0.02 |
| 1-propanol | | 1.00 | | | | | | | | | | | |
| 2-propanol | | | 1.00 | | | | | | | | | | |
| 1-butyl alcohol | | | | | | | | | | | | | |
| 2-butyl alcohol | | | | | | | | | | | | | |
| 1-pentyl alcohol | | | | | | | | | | | | | |
| 2-pentyl alcohol | | | | | | | | | | | | | |
| 3-pentyl alcohol | | | | | | | | | | | | | |
| 1-hexyl alcohol | | | | | | | | | | | | | |
| 1-heptanol | | | | | 0.10 | | | | | | | | |
| 2-heptanol | | | | | | 0.10 | | | | | | | |
| 3-heptanol | | | | | | | 0.10 | | | | | | |
| 4-heptanol | | | | | | | | 0.10 | | | | | |
| 1,3-propanediol | | | | | | | | | | 3.00 | | | |
| 1,2-hexanediol | | | | | | | | | | | | | |
| 1,2-heptanediol | | | | | | | | | | | 3.00 | | |
| 1,7-heptanediol | | | | | | | | | | | | 3.00 | |

TABLE 8-continued

| | | | | | | | | | | | | |
|---|---|---|---|---|---|---|---|---|---|---|---|---|
| heptane-diol | | | | | | | | | | | | |
| 1,2,4-butane-triol | | | | | | | | | | | 3.00 | |
| 1,2,6-hexane-triol | | | | | | | | | | | | 3.00 |
| Water | 68.27 | 68.87 | 67.27 | 67.27 | 68.17 | 68.17 | 68.17 | 68.17 | 65.27 | 65.27 | 65.27 | 68.27 | 68.27 |
| Total | 100.00 | 100.00 | 100.00 | 100.00 | 100.00 | 100.00 | 100.00 | 100.00 | 100.00 | 100.00 | 100.00 | 100.00 | 100.00 |

TABLE 9

| | Comparative Examples | | | | | | | | | |
|---|---|---|---|---|---|---|---|---|---|---|
| Ink Composition | 27 | 28 | 29 | 30 | 31 | 32 | 33 | 34 | 35 | 36 |
| Magenta dye [1] | | | | | | | | | | |
| Magenta dye 2 [2] | 5.00 | 5.00 | 5.00 | 5.00 | 5.00 | 5.00 | 5.00 | 5.00 | 5.00 | 5.00 |
| Betaine-based surfactant [3] | 1.00 | | 1.00 | 1.00 | 1.00 | 1.00 | 1.00 | 1.00 | 1.00 | 1.00 |
| TEGmBE [4] | 9.00 | 9.00 | 9.00 | 9.00 | 9.00 | 9.00 | 9.00 | 9.00 | 9.00 | 9.00 |
| Glycerin | 9.00 | 9.00 | 9.00 | 9.00 | 9.00 | 9.00 | 9.00 | 9.00 | 9.00 | 9.00 |
| 2-pyrrol-idone | 3.20 | 3.20 | 3.20 | 3.20 | 3.20 | 3.20 | 3.20 | 3.20 | 3.20 | 3.20 |
| Olfine E1010 [5] | 0.70 | 0.70 | 0.70 | 0.70 | 0.70 | 0.70 | 0.70 | 0.70 | 0.70 | 0.70 |
| Olfine PD002W [5] | 0.10 | 0.10 | 0.10 | 0.10 | 0.10 | 0.10 | 0.10 | 0.10 | 0.10 | 0.10 |
| Triethanol-amine | 0.40 | 0.40 | 0.40 | 0.40 | 0.40 | 0.40 | 0.40 | 0.40 | 0.40 | 0.40 |
| Urea | 5.00 | 5.00 | 5.00 | 5.00 | 5.00 | 5.00 | 5.00 | 5.00 | 5.00 | 5.00 |
| Benzo-triazole | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 |
| 1-propanol | | | | | | | | | | |
| 2-propanol | | | | | | | | | | |
| 1-butyl alcohol | 1.00 | 1.00 | 0.25 | | | | | | | |
| 2-butyl alcohol | | | | 1.00 | 0.25 | | | | | |
| 1-pentyl alcohol | | | | | | 1.00 | 0.25 | | | |
| 2-pentyl alcohol | | | | | | | | 1.00 | 0.25 | |
| 3-pentyl alcohol | | | | | | | | | | 1.00 |
| 1-hexyl alcohol | | | | | | | | | | |
| 1-heptanol | | | | | | | | | | |
| 2-heptanol | | | | | | | | | | |
| 3-heptanol | | | | | | | | | | |
| 4-heptanol | | | | | | | | | | |
| 1,3-propane-diol | | | | | | | | | | |
| 1,2-hexane-diol | | | | | | | | | | |
| 1,2-heptane-diol | | | | | | | | | | |
| 1,7-heptane-diol | | | | | | | | | | |
| 1,2,4-butane-triol | | | | | | | | | | |
| 1,2,6-hexane-triol | | | | | | | | | | |
| Water | 65.27 | 66.27 | 66.02 | 65.27 | 66.02 | 65.27 | 66.02 | 65.27 | 66.02 | 65.27 |
| Total | 100.00 | 100.00 | 100.00 | 100.00 | 100.00 | 100.00 | 100.00 | 100.00 | 100.00 | 100.00 |

| | Comparative Examples | | | | | | | | | |
|---|---|---|---|---|---|---|---|---|---|---|
| Ink Composition | 37 | 38 | 39 | 40 | 41 | 42 | 43 | 44 | 45 | 46 |
| Magenta dye [1] | | | | | | | | | | |
| Magenta dye 2 [2] | 5.00 | 5.00 | 5.00 | 0.50 | 0.50 | 0.50 | 0.50 | 0.50 | 0.50 | 0.50 |
| Betaine-based surfactant [3] | 1.00 | 1.00 | 1.00 | 0.60 | 0.60 | | 0.60 | 0.60 | 0.60 | 0.60 |
| TEGmBE [4] | 9.00 | 9.00 | 9.00 | 9.00 | 9.00 | 9.00 | 9.00 | 9.00 | 9.00 | 9.00 |
| Glycerin | 9.00 | 9.00 | 9.00 | 13.00 | 13.00 | 13.00 | 13.00 | 13.00 | 13.00 | 13.00 |
| 2-pyrrol-idone | 3.20 | 3.20 | 3.20 | 3.50 | 3.50 | 3.50 | 3.50 | 3.50 | 3.50 | 3.50 |
| Olfine E1010 [5] | 0.70 | 0.70 | 0.70 | 0.40 | 0.40 | 0.40 | 0.40 | 0.40 | 0.40 | 0.40 |
| Olfine PD002W [5] | 0.10 | 0.10 | 0.10 | 0.40 | 0.40 | 0.40 | 0.40 | 0.40 | 0.40 | 0.40 |
| Triethanol-amine | 0.40 | 0.40 | 0.40 | | | | | | | |
| Urea | 5.00 | 5.00 | 5.00 | 4.00 | 4.00 | 4.00 | 4.00 | 4.00 | 4.00 | 4.00 |
| Benzo-triazole | 0.01 | 0.01 | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 | 0.02 | 0.02 |
| 1-propanol | | | | | | | | | | |
| 2-propanol | | | | | | | | | | |
| 1-butyl alcohol | | | | | 1.00 | 1.00 | 0.25 | | | |
| 2-butyl alcohol | | | | | | | | 1.00 | 0.25 | |

TABLE 9-continued

| | | | | | | | | | | |
|---|---|---|---|---|---|---|---|---|---|---|
| 1-pentyl alcohol | | | | | | | | | | 1.00 |
| 2-pentyl alcohol | | | | | | | | | | |
| 3-pentyl alcohol | 0.25 | | | | | | | | | |
| 1-hexyl alcohol | | 1.00 | 0.25 | | | | | | | |
| 1-heptanol | | | | | | | | | | |
| 2-heptanol | | | | | | | | | | |
| 3-heptanol | | | | | | | | | | |
| 4-heptanol | | | | | | | | | | |
| 1,3-propane-diol | | | | | | | | | | |
| 1,2-hexane-diol | | | | | 3.00 | | | | | |
| 1,2-heptane-diol | | | | | | | | | | |
| 1,7-heptane-diol | | | | | | | | | | |
| 1,2,4-butane-triol | | | | | | | | | | |
| 1,2,6-hexane-triol | | | | | | | | | | |
| Water | 66.02 | 65.27 | 66.02 | 65.27 | 67.27 | 67.87 | 68.02 | 67.27 | 68.02 | 67.27 |
| Total | 100.00 | 100.00 | 100.00 | 100.00 | 100.00 | 100.00 | 100.00 | 100.00 | 100.00 | 100.00 |

| | Comparative Examples | | | | | | | |
|---|---|---|---|---|---|---|---|---|
| Ink Composition | 47 | 48 | 49 | 50 | 51 | 52 | 53 | 54 |
| Magenta dye [1] | | | | | | | | |
| Magenta dye 2 [2] | 5.00 | 5.00 | 5.00 | 0.50 | 0.50 | 0.50 | 0.50 | 0.50 |
| Betaine-based surfactant [3] | 0.60 | 0.60 | 0.60 | 0.60 | 0.60 | 0.60 | 0.60 | 0.60 |
| TEGmBE [4] | 9.00 | 9.00 | 9.00 | 9.00 | 9.00 | 9.00 | 9.00 | 9.00 |
| Glycerin | 13.00 | 13.00 | 13.00 | 13.00 | 13.00 | 13.00 | 13.00 | 13.00 |
| 2-pyrrol-idone | 3.50 | 3.50 | 3.50 | 3.50 | 3.50 | 3.50 | 3.50 | 3.50 |
| Olfine E1010 [5] | 0.40 | 0.40 | 0.40 | 0.40 | 0.40 | 0.40 | 0.40 | 0.40 |
| Olfine PD002W [5] | 0.40 | 0.40 | 0.40 | 0.40 | 0.40 | 0.40 | 0.40 | 0.40 |
| Triethanol-amine | | | | | | | | |
| Urea | 4.00 | 4.00 | 4.00 | 4.00 | 4.00 | 4.00 | 4.00 | 4.00 |
| Benzo-triazole | 0.01 | 0.01 | 0.01 | 0.01 | 0.01 | 0.01 | 0.01 | 0.01 |
| Proxel XL-2 [6] | 0.30 | 0.30 | 0.30 | 0.30 | 0.30 | 0.30 | 0.30 | 0.30 |
| EDTA [7] | 0.02 | 0.02 | 0.02 | 0.02 | 0.02 | 0.02 | 0.02 | 0.02 |
| 1-propanol | | | | | | | | |
| 2-propanol | | | | | | | | |
| 1-butyl alcohol | | | | | | | | |
| 2-butyl alcohol | | | | | | | | |
| 1-pentyl alcohol | 0.25 | | | | | | | |
| 2-pentyl alcohol | | 1.00 | 0.25 | | | | | |
| 3-pentyl alcohol | | | | 1.00 | 0.25 | | | |
| 1-hexyl alcohol | | | | | | 1.00 | 0.25 | |
| 1-heptanol | | | | | | | | |
| 2-heptanol | | | | | | | | |
| 3-heptanol | | | | | | | | |
| 4-heptanol | | | | | | | | |
| 1,3-propane-diol | | | | | | | | |
| 1,2-hexane-diol | | | | | | | | 3.00 |
| 1,2-heptane-diol | | | | | | | | |
| 1,7-heptane-diol | | | | | | | | |
| 1,2,4-butane-triol | | | | | | | | |
| 1,2,6-hexane-triol | | | | | | | | |
| Water | 68.02 | 67.27 | 68.02 | 67.27 | 68.02 | 67.27 | 68.02 | 65.27 |
| Total | 100.00 | 100.00 | 100.00 | 100.00 | 100.00 | 100.00 | 100.00 | 100.00 |

[Evaluation of Light Resistance]

A printing test was carried out using the PM-A750 (trademark) Ink Jet Printer (Seiko Epson Corp.). The ink compositions of Examples 1 to 26 and Comparative Examples 1 to 54 were respectively filled into special-purpose magenta ink jet cartridges for use with this printer, and printed onto a dedicated ink jet recording medium (Crispia Photographic Paper <High Gloss> (Seiko Epson Corp.)) to obtain recorded articles. The printing configuration consisted of printing with magenta only, and the optical density (hereinafter called "OD") of the resulting images was adjusted so as to be within a density range of 0.9 to 1.1. The resulting recorded articles were dried for about 1 day at room temperature to obtain the desired recorded articles. The light resistance of the resulting samples was then evaluated.

The light resistance test consisted of irradiating the recorded articles with light under conditions consisting of a temperature of 24° C., humidity of 60% RH and luminosity of 70000 lux using the SFT-II fluorescent light resistance tester (trade name, Suga Test Instruments Co., Ltd.). OD values of the recorded articles irradiated in this manner before and after irradiating with light were then measured using the Spectrolino (trademark) reflection densitometer (trade name, Gretag Ltd.). The relict optical density (hereinafter called "ROD") was then calculated from the resulting OD values using the equation below. Furthermore, measurement of OD values was carried out using a green D50 light source and absolute white for the white standard at a view angle of 2°.

$$\text{ROD}(\%) = (D_n/D_o) \times 100$$

(wherein, Dn indicates the OD value of the image after completion of the light irradiation test, while Do indicates the OD value of the image before the start of the light irradiation test).

Moreover, the light resistance of each color recorded on the recorded articles was evaluated using the following evaluation criteria based on the results of the above test. Those results are shown in Tables 10 to 12. Furthermore, in this test, the smaller the decrease in ROD of the recorded article, the lower the deterioration of the image even if exposed to fluorescent light for an extended period of time.

(Evaluation Criteria)
Level 1: ROD decreased to 70% in 11 days
Level 2: ROD decreased to 70% in more than 11 days up to 21 days
Level 3: ROD decreased to 70% in more than 22 days up to 32 days
Level 4: ROD decreased to 70% in more than 33 days up to 43 days
Level 5: ROD decreased to 70% in more than 44 days up to 54 days
Level 6: ROD decreased to 70% in more than 55 days up to 65 days
Level 7: ROD decreased to 70% in more than 66 days up to 76 days
Level 8: ROD decreased to 70% in more than 77 days

[Evaluation of Moisture Resistance]

A printing test was carried out using the PM-A750 (trademark) Ink Jet Printer (trade name, Seiko Epson Corp.). The ink compositions of Examples 1 to 26 and Comparative Examples 1 to 54 were respectively filled into a special-purpose magenta ink cartridge for use with this printer, and printed onto a dedicated ink jet recording medium (Crispia Photographic Paper <High Gloss> (Seiko Epson Corp.)) to obtain recorded articles. The printing configuration consisted of printing with magenta only to obtain the maximum OD (optical density). Moisture resistance was then evaluated for the resulting samples. After allowing each sample to stand undisturbed for 4 days in environment at 40° C. and 85% RH in the absence of light, the degree of bleeding of characters and outline characters was evaluated visually. The moisture resistance of each sample was then evaluated based on the evaluation criteria indicated below. Those results are shown in Tables 10 to 12.

(Evaluation Criteria)
Level 1: Remarkable bleeding of colorant, illegible characters and outline characters
Level 2: Some bleeding of colorant, increased character width and outline characters completely filled in
Level 3: Some bleeding of colorant, disturbance of character borders
Level 4: Slight bleeding of colorant, some disturbance of character borders
Level 5: Hardly any bleeding of colorant observed
Level 6: No bleeding of colorant observed

[Foaming/Defoaming Properties]

Bubbling (foaming) and debubbling (defoaming) were measured by observing visually and observing changes in bubble height over time. More specifically, 10 g of the ink formulations of each of the examples and comparative examples were sealed in a cylindrical glass container having a diameter of 2 cm and height of 10 cm and mixed by shaking 50 times followed by measuring the height (H) from the interface between the bubbles and liquid to the maximum height of the bubbles, and using as the value of "foaming" that indicates the ease of bubbling of the ink compositions. Continuing, the time (minutes) required for the height (H) from the interface between the bubbles and the liquid to the maximum height of the bubbles to reach 0.5H was measured, and used as the value of "defoaming" that indicates the ease of debubbling of the ink compositions. (The experiment was carried out at an atmospheric temperature of 23 to 24° C.)

The results are shown in Tables 10 to 12. As a result of the test, the ink compositions containing the magenta dye represented by formula (1) and the betaine-based surfactant represented by formula (6) ensured superior image durability (light resistance, moisture resistance), and those ink compositions further containing 1-butyl alcohol, 2-butyl alcohol, 1-pentyl alcohol, 2-pentyl alcohol, 3-pentyl alcohol, 1-hexyl alcohol and 1,2-hexanediol were determined to improve foaming and defoaming properties.

In particular, 1-pentyl alcohol, 2-pentyl alcohol, 3-pentyl alcohol, 1-hexyl alcohol and 1,2-hexanediol demonstrated the effect of considerably improving the foaming and defoaming properties of the ink compositions.

TABLE 10

| | 1 | 2 | 3 | 4 | 5 | 6 | 7 | 8 | 9 | 10 | 11 | 12 | 13 |
|---|---|---|---|---|---|---|---|---|---|---|---|---|---|
| | Examples | | | | | | | | | | | | |
| Light resistance (−) | 7 | 7 | 7 | 7 | 7 | 7 | 7 | 7 | 7 | 7 | 7 | 7 | 7 |
| Moisture resistance (−) | 4 | 4 | 4 | 4 | 4 | 4 | 4 | 4 | 4 | 4 | 4 | 4 | 4 |
| Foaming (cm) | 7 | 7 | 7 | 7 | 4 | 6 | 5 | 6 | 5 | 6 | 4 | 5 | 6 |
| Defoaming (min.) | 8 | 12 | 8 | 12 | 3 | 5 | 3 | 5 | 3 | 5 | 2 | 4 | 9 |
| | Comparative Examples | | | | | | | | | | | | |
| Light resistance (−) | 7 | 5 | 7 | 7 | 7 | 7 | 7 | 7 | 7 | 7 | 7 | 7 | 7 |
| Moisture resistance (−) | 4 | 1 | 4 | 4 | 4 | 4 | 4 | 4 | 4 | 4 | 4 | 4 | 4 |
| Foaming (cm) | 9 | 9 | 9 | 9 | 7 | 7 | 7 | 6 | 8 | 8 | 7 | 7 | 8 |
| Defoaming (min.) | 28 | 27 | 21 | 19 | 24 | 26 | 27 | 23 | 20 | 22 | 23 | 22 | 21 |

TABLE 11

| | 14 | 15 | 16 | 17 | 18 | 19 | 20 | 21 | 22 | 23 | 24 | 25 | 26 |
|---|---|---|---|---|---|---|---|---|---|---|---|---|---|
| | Examples | | | | | | | | | | | | |
| Light resistance (−) | 6 | 6 | 6 | 6 | 6 | 6 | 6 | 6 | 6 | 6 | 6 | 6 | 6 |
| Moisture resistance (−) | 4 | 4 | 4 | 4 | 4 | 4 | 4 | 4 | 4 | 4 | 4 | 4 | 4 |

TABLE 11-continued

|  | 14 | 15 | 16 | 17 | 18 | 19 | 20 | 21 | 22 | 23 | 24 | 25 | 26 |
|---|----|----|----|----|----|----|----|----|----|----|----|----|----|
| Foaming (cm) | 5 | 6 | 5 | 6 | 4 | 5 | 4 | 5 | 4 | 5 | 3 | 4 | 5 |
| Defoaming (min.) | 8 | 10 | 8 | 10 | 2 | 4 | 2 | 5 | 2 | 4 | 1 | 2 | 8 |

Comparative Examples

| | | | | | | | | | | | | | |
|---|---|---|---|---|---|---|---|---|---|---|---|---|---|
| Light resistance (−) | 6 | 4 | 6 | 6 | 6 | 6 | 6 | 6 | 6 | 6 | 6 | 6 | 6 |
| Moisture resistance (−) | 4 | 1 | 4 | 4 | 4 | 4 | 4 | 4 | 4 | 4 | 4 | 4 | 4 |
| Foaming (cm) | 9 | 9 | 8 | 8 | 6 | 6 | 6 | 7 | 7 | 8 | 6 | 7 | 8 |
| Defoaming (min.) | 24 | 25 | 18 | 18 | 21 | 22 | 19 | 20 | 20 | 21 | 21 | 22 | 23 |

TABLE 12

Comparative Examples

|  | 27 | 28 | 29 | 30 | 31 | 32 | 33 | 34 | 35 | 36 | 37 | 38 | 39 |
|---|----|----|----|----|----|----|----|----|----|----|----|----|----|
| Light resistance (−) | 2 | 2 | 2 | 2 | 2 | 2 | 2 | 2 | 2 | 2 | 2 | 2 | 2 |
| Moisture resistance (−) | 3 | 3 | 3 | 3 | 3 | 3 | 3 | 3 | 3 | 3 | 3 | 3 | 3 |
| Foaming (cm) | 6 | 2 | 6 | 7 | 7 | 4 | 6 | 5 | 6 | 5 | 5 | 4 | 4 |
| Defoaming (min.) | 6 | 1 | 12 | 8 | 11 | 3 | 5 | 4 | 5 | 3 | 5 | 2 | 3 |

Comparative Examples

|  | 40 | 41 | 42 | 43 | 44 | 45 | 46 | 47 | 48 | 49 | 50 | 51 | 52 | 53 | 54 |
|---|----|----|----|----|----|----|----|----|----|----|----|----|----|----|----|
| Light resistance (−) | 2 | 2 | 2 | 2 | 2 | 2 | 2 | 2 | 2 | 2 | 2 | 2 | 2 | 2 | 2 |
| Moisture resistance (−) | 3 | 3 | 3 | 3 | 3 | 3 | 3 | 3 | 3 | 3 | 3 | 3 | 3 | 3 | 3 |
| Foaming (cm) | 6 | 5 | 3 | 6 | 6 | 6 | 4 | 5 | 4 | 5 | 4 | 4 | 3 | 3 | 5 |
| Defoaming (min.) | 8 | 9 | 1 | 10 | 9 | 9 | 2 | 4 | 2 | 5 | 2 | 5 | 2 | 2 | 7 |

The ink composition of the present invention can be used as a particularly preferable ink for an ink jet printer. In addition, the ink jet recording method of the present invention can be used an ink jet recording method for recording onto various recording media. Moreover, the recorded article of the present invention can be used as a recorded article on which various information is recorded.

What is claimed is:

1. An ink composition comprising: a betaine-based surfactant represented by the following general formula (1) and a linear saturated aliphatic alcohol having a hydroxyl value of 1 to 2 and 4 to 6 carbon atoms:

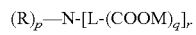
Formula (1)

wherein, R represents a hydrogen atom, alkyl group, aryl group or heterocyclic Group; L represents a divalent or more linking group; M represents a hydrogen atom, alkali metal atom, ammonium group, protonated organic amine or nitrogen-containing heterocyclic group or quaternary ammonium ion group, or represents a group that does not exist as a cation in the case of being a counter ion of an ammonium ion formed of an N atom in formula (1); q represents an integer of 1 or more; r represents an integer of 1 to 4; p represents an integer of 0 to 4; p+r is 3 or 4; N is a nitrogen atom that composes a quaternary amine in the case p+r is 4; R may be the same or different when p is 2 or more; COOM may be the same or different when q is 2 or more; and L-(COOM)$_q$ may be the same or different when r is 2 or more.

2. The ink composition according to claim 1, wherein the betaine-based surfactant represented by formula (1) is a compound represented by the following formula (1-1):

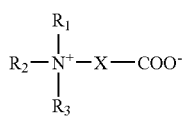
Formula (1-1)

wherein, $R_1$ $R_3$ represent an alkyl group having 1 to 20 carbon atoms, and X represents a divalent linking group.

3. The ink composition according to claim 1, wherein the betaine-based surfactant represented by formula (1) is a compound represented by the following formula (1-2):

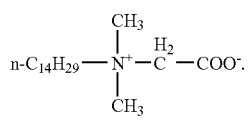

Formula (1-2)

4. The ink composition according to claim 1, wherein the content of the linear saturated aliphatic alcohol having a hydroxyl value of 1 to 2 and 4 to 6 carbon atoms is 0.25 to 5.00% by weight.

5. The ink composition according to claim 1, wherein the ratio of the content of the linear saturated aliphatic alcohol having a hydroxyl value of 1 to 2 and 4 to 6 carbon atoms to the content of the betaine-based surfactant is a weight ratio of 1:3 to 1:0.4.

6. The ink composition according to claim 1, wherein the linear saturated aliphatic alcohol is one or more compound selected from the group consisting of 1-butyl alcohol, 2-butyl alcohol, 1-pentyl alcohol, 2-pentyl alcohol, 3-pentyl alcohol, 1-hexyl alcohol and 1,2-hexanediol.

7. The ink composition according to claim 1, wherein the linear saturated aliphatic alcohol has 5 or 6 carbon atoms.

8. The ink composition according to claim 7, wherein the linear saturated aliphatic alcohol is at least one type selected from the group consisting of 1-pentyl alcohol, 2-pentyl alcohol, 3-pentyl alcohol, 1-hexyl alcohol and 1,2-hexanediol.

9. An ink composition comprising a magenta dye represented by the following general formula (2); a betaine-based surfactant represented by the following general formula (1); and a linear saturated aliphatic alcohol having a hydroxyl value of 1 to 2 and 4 to 6 carbon atoms:

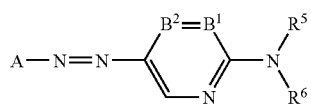

Formula (2)

wherein, A represents a residue of a five-member heterocyclic diazo component A-NH$_2$; B$^1$ and B$^2$ each represent —CR$^1$= or —CR$^2$= or one represents a nitrogen atom and the other represents —CR$^1$= or —CR$^3$=; R$^5$ and R$^6$ each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, each group may further have a substituent; G, R$^1$ and R$^2$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryloxycarbonylamino group, alkyl and arylsulfonylamino group, aryloxycarbonylamino group, nitro group, alkyl and arylthio group, alkyl and arylsulfonyl group, alkyl and arylsulfinyl group, sulfamoyl group, sulfo group or heterocyclic thio group, each group may be further substituted, and R$^1$ and R$^5$ or R$^1$ and R$^3$ may be bonded to form a five- to six-member ring;

$(R)_p$—N-[(COOM)$_q$]$_r$   Formula (1)

wherein, R represents a hydrogen atom, alkyl group, aryl group or heterocyclic group; L represents a divalent or more linking group; M represents a hydrogen atom, alkali metal atom, ammonium group, protonated organic amino or nitrogen-containing heterocyclic group or quaternary ammonium ion group, or represents a group that does not exist as a cation in the case of being a counter ion of an ammonium ion formed of an N atom in formula (1); q represents an integer of 1 or more; r represents an integer of 1 to 4; p represents an integer of 0 to 4; p+r is 3 or 4; N is a nitrogen atom that composes a quaternary amine in the case p =r is 4; R may be the same or different when p is 2 or more; COOM may be the same or different when q is 2 or more, and L-(COOM)$_q$ may be the same or different when r is 2 or more).

10. The ink composition according to claim 9, wherein the linear saturated aliphatic alcohol is one or more compounds selected from the group consisting of 1-butyl alcohol, 2-butyl alcohol, 2-pentyl alcohol, 3-pentyl alcohol, 1-hexyl alcohol and 1,2-hexanediol.

11. The ink composition according to claim 9, wherein the linear saturated aliphatic alcohol has 5 or 6 carbon atoms.

12. The ink composition according to claim 9, wherein the linear saturated aliphatic alcohol is one or more compounds selected from the group consisting of 2-pentyl alcohol, 3-pentyl alcohol and 1-hexyl alcohol.

13. The ink composition according to claim 9, wherein the content of the linear saturated aliphatic alcohol having a hydroxyl value of 1 to 2 and 4 to 6 carbon atoms is 0.25 to 3.00% by weight.

14. The ink composition according to claim 9, wherein the magenta dye represented by the formula (2) is a magenta dye represented by the following general formula (3):

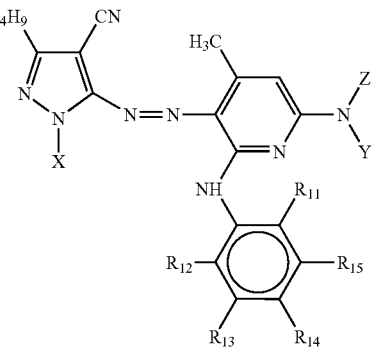

Formula (3)

wherein, R$_{11}$ and R$_{12}$ each independently represent an alkyl group, alkoxy group or halogen atom, the total number of carbon atoms that compose the alkyl groups is 3 or more when R$_{11}$ and R$_{12}$ are both alkyl groups, these groups may be further substituted; R$_{13}$, R$_{14}$ and R$_{15}$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted; $R_{11}$ and $R_{15}$ or $R_{12}$ and $R_{13}$ may be mutually condensed into a ring, X represents a hydrogen atom, aliphatic group, aromatic group or heterocyclic group; Y and Z each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group, and each group may further have a substituent.

15. The ink composition according to claim 9, wherein the magenta dye represented by the formula (2) is a magenta dye represented by the following general formula (4):

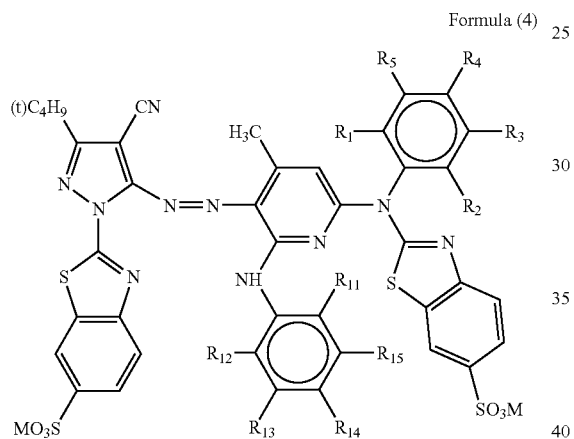

Formula (4)

wherein, $R_1$ and $R_2$ each independently represent an alkyl group, alkoxy group or halogen atom, the total number of carbon atoms that compose the alkyl groups is 3 or more when both $R_1$ and $R_2$ are alkyl groups, these groups may be further substituted; $R_3$, $R_4$ and $R_5$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted; $R_1$ and $R_5$ or $R_2$ and $R_3$ may be mutually condensed into a ring; $R_{11}$ and $R_{12}$ each independently represent an alkyl group, alkoxy group or halogen atom, the total number of carbon atoms that compose the alkyl groups is 3 or more when $R_{11}$ and $R_{12}$ are both alkyl groups, these may be further substituted; $R_{13}$, $R_{14}$ and $R_{15}$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, alkylamino group, arylamino group, heterocyclic amino group, acylamino group, ureido group, sulfamoylamino group, alkoxycarbonylamino group, aryloxycarbonylamino group, alkyl or arylsulfonylamino group, aryloxycarbonylamino group, nitro group, alkyl or arylthio group, alkyl or arylsulfonyl group, alkyl or arylsulfinyl group, sulfamoyl group, sulfo group or heterocyclic thio group, each group may be further substituted; $R_{11}$ and $R_{15}$ or $R_{12}$ and $R_{13}$ may be mutually condensed into a ring, and M represents hydrogen, lithium, sodium, potassium, ammonium or an organic amine.

16. The ink composition according to claim 9, wherein the magenta dye represented by the formula (2) is a magenta dye represented by the following formula (5):

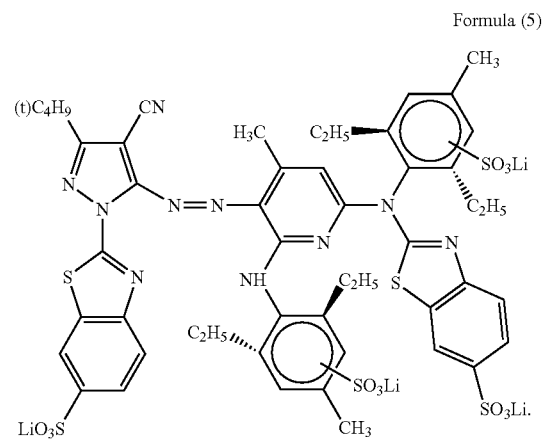

Formula (5)

17. The ink composition according to claim 9, wherein the content of the magenta dye is 0.50 to 5.00% by weight based on the total weight of the ink composition.

18. The ink composition according to claim 9, wherein the betaine-based surfactant represented by the formula (1) is a compound represented by the following general formula (1-1):

Formula (1-1)

wherein, $R_1$ to $R_3$ represent an alkyl group having 1 to 20 carbon atoms, and X represents a divalent linking group.

19. The ink composition according to claim 9, wherein the betaine-based surfactant represented by the general formula (1) is a compound represented by the following formula (1-2):

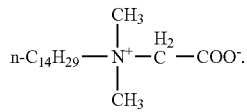

Formula (1-2)

20. The ink composition according to claim 9, wherein the ratio of the content of the linear saturated aliphatic alcohol having a hydroxyl value of 1 to 2 and 4 to 6 carbon atoms to the content of the betaine-based surfactant is a weight ratio of 1:5 to 1:0.25.

21. The ink composition according to claim 9, wherein the ratio of the content of the betaine-based surfactant to the content of the magenta dye is a weight ratio of 1:1.2 to 1:0.2.

22. The An ink jet recording method comprising providing the ink composition according to claim 9, wherein liquid droplets of the ink composition are discharged and the liquid droplets are adhered to a recording medium for performing recording.

23. The ink jet recording method according to claim 22, wherein an ink jet head forms the ink droplets by mechanical deformation of a piezoelectric device.

24. An ink cartridge filled with the ink composition according to claim 1.

25. An ink jet recording method comprising depositing the ink composition according to claim 1 onto a recording medium.

26. A recorded article recorded according to the ink jet recording method according to claim 25.

* * * * *